(12) United States Patent
Zhang et al.

(10) Patent No.: US 12,664,630 B2
(45) Date of Patent: Jun. 23, 2026

(54) ALBEDO RECONSTRUCTION BASED ON INVERSE SHADING PREDICTION

(71) Applicant: Adobe Inc., San Jose, CA (US)

(72) Inventors: He Zhang, Santa Clara, CA (US); Jae Shin Yoon, San Jose, CA (US); Hyun Joon Jung, Monte Sereno, CA (US); Xin Sun, Santa Clara, CA (US)

(73) Assignee: Adobe Inc., San Jose, CA (US)

( * ) Notice: Subject to any disclaimer, the term of this patent is extended or adjusted under 35 U.S.C. 154(b) by 292 days.

(21) Appl. No.: 18/241,039

(22) Filed: Aug. 31, 2023

(65) Prior Publication Data

US 2025/0078229 A1     Mar. 6, 2025

(51) Int. Cl.
| | |
|---|---|
| *G06T 5/94* | (2024.01) |
| *G06T 7/11* | (2017.01) |
| *G06T 7/40* | (2017.01) |
| *G06T 7/90* | (2017.01) |

(52) U.S. Cl.
CPC .................. *G06T 5/94* (2024.01); *G06T 7/11* (2017.01); *G06T 7/40* (2013.01); *G06T 7/90* (2017.01); *G06T 2207/10024* (2013.01); *G06T 2207/20081* (2013.01); *G06T 2207/20084* (2013.01); *G06T 2207/30201* (2013.01)

(58) Field of Classification Search
CPC ..... G06T 5/94; G06T 7/11; G06T 7/90; G06T 7/40; G06T 2207/10024; G06T 2207/20081; G06T 2207/20084; G06T 2207/30201; G06T 5/90; G06T 15/04; G06T 15/506; G06T 2207/10152; G06T 11/001
See application file for complete search history.

(56) References Cited

U.S. PATENT DOCUMENTS

| | | | |
|---|---|---|---|
| 2020/0160593 A1* | 5/2020 | Gu | G06T 7/90 |
| 2022/0292762 A1* | 9/2022 | Boubekeur | G06T 11/001 |

OTHER PUBLICATIONS

W. A. P. Smith and E. R. Hancock, "Estimating the albedo map of a face from a single image," IEEE International Conference on Image Processing 2005, Genova, Italy, 2005, pp. III-780, doi: 10.1109/ICIP.2005.1530508. (Year: 2005).*

(Continued)

*Primary Examiner* — Utpal D Shah
*Assistant Examiner* — Jack Peter Kraynak
(74) *Attorney, Agent, or Firm* — Shook, Hardy & Bacon L.L.P.

(57) ABSTRACT

Various disclosed embodiments are directed to deriving an albedo output image from an input image based on deriving an inverse shading map. For example, an input image can be a photograph of a human face (i.e., the geometric features) with RGB values representing the color values of the face as well as pixels representing shadows (i.e., the shadow features) underneath the chin of the human face. The inverse shading map may be a black and white pixel value image that contains pixels representing the same human face without the RGB values and the shadows underneath the chin. The inverse shading map thus relies on the geometric space, rather than RGB space. Geometric space, for example, allows embodiments to capture the geometric features of a face, as opposed to those geometric features' RGB or shadow details.

20 Claims, 11 Drawing Sheets
(4 of 11 Drawing Sheet(s) Filed in Color)

INPUT IMAGE          INVERSE SHADING MAP          ALBEDO IMAGE

(56) References Cited

OTHER PUBLICATIONS

S. Suh, M. Lee and C.-H. Choi, "Robust Albedo Estimation From a Facial Image With Cast Shadow Under General Unknown Lighting," in IEEE Transactions on Image Processing, vol. 22, No. 1, pp. 391-401, Jan. 2013, doi: 10.1109/TIP.2012.2214042 (Year: 2013).*

Ji, C., Yu, T., Guo, K., Liu, J., & Liu, Y. (Oct. 2022). Geometry-aware single-image full-body human relighting. In European conference on computer vision (pp. 388-405). Cham: Springer Nature Switzerland. (Year: 2022).*

Hou, A., Sarkis, M., Bi, N., Tong, Y., & Liu, X. (2022). Face relighting with geometrically consistent shadows. In Proceedings of the IEEE/CVF conference on computer vision and pattern recognition (pp. 4217-4226) (Year: 2022).*

Pandey, R., Orts-Escolano, S., Legendre, C., Haene, C., Bouaziz, S., Rhemann, C., . . . & Fanello, S. R. (2021). Total relighting: learning to relight portraits for background replacement. ACM Trans. Graph., 40(4), 43-1. (Year: 2021).*

Iqbal, U., Caliskan, A., Nagano, K., Khamis, S., Molchanov, P., & Kautz, J. (2022). RANA: Relightable Articulated Neural Avatars. 2023 IEEE/CVF International Conference on Computer Vision (ICCV), 23085-23096. (Year: 2022).*

Zhaoxi Chen and Ziwei Liu. Relighting4d: Neural relightable human from videos. In Computer Vision—ECCV 2022: 17th European Conference, Tel Aviv, Israel, Oct. 23-27, 2022, Proceedings, Part XIV, pp. 606-623. Springer, 2022.

Ian Goodfellow Jean Pouget-Abadie, Mehdi Mirza, Bing Xu, David Warde-Farley, Sherjil Ozair, Aaron Courville, and Yoshua Bengio. Generative adversarial networks. Communications of the ACM, 63(11):139-144, 2020.

Andrew Hou, Michel Sarkis, Ning Bi, Yiying Tong, and Xiaoming Liu. Face relighting with geometrically consistent shadows. In Proceedings of the IEEE/CVF Conference on Computer Vision and Pattern Recognition, pp. 4217-4226, 2022.

Kaixuan Huang, Yuqing Wang Wang, Molei Tao, and Tuo Zhao. Why do deep residual networks generalize better than deep feedforward networks?—a neural tangent kernel perspective. Advances in neural information processing systems, 33:2698-2709, 2020.

Umar Iqbal, Akin Caliskan, Koki Nagano Sameh Khamis, Pavlo Molchanov, and Jan Kautz. Rana: Relightable articulated neural avatars. arXiv preprint arXiv:2212.03237, 2022.

Chaonan Ji, Tao Yu, Kaiwen Guo, Jingxin Liu, and Yebin Liu. Geometry-aware single-image full-body human relighting. In Computer Vision—ECCV 2022: 17th European Conference, Tel Aviv, Israel, Oct. 23-27, 2022, Proceedings, Part XVI, pp. 388-405. Springer, 2022.

Justin Johnson, Alexandre Alahi, and Li Fei-Fei. Perceptual losses for real-time style transfer and super-resolution. In European conference on computer vision, pp. 694-711. Springer, 2016.

Manuel Lagunas, Xin Sun, Jimei Yang, Ruben Villegas, Jianming Zhang, Zhixin Shu, Belen Masia, and Diego Gutierrez Single-image full-body human relighting. arXiv preprint arXiv:2107.07259, 2021.

Rohit Pandey, Sergio Orts Escolano, Chloe Legendre, Christian Haene, Sofien Bouaziz, Christoph Rhemann, Paul Debevec, and Sean Fanello. Total relighting: learning to relight portraits for background replacement. ACM Transactions on Graphics (TOG), 40(4):1-21, 2021.

Puntawat Ponglertnapakorn, Nontawat Tritong, and Supasorn Suwajanakorn. Difareli: Diffusion face relighting. arXiv preprint arXiv:2304.09479, 2023.

Olaf Ronneberger, Philipp Fischer, and Thomas Brox. U-net:Convolutional networks for biomedical image segmentation. In Medical Image Computing and Computer-Assisted Intervention—MICCAI 2015: 18th International Conference, Munich, Germany, Oct. 5-9, 2015, Proceedings, Part III 18, pp. 234-241. Springer, 2015.

Daichi Tajima, Yoshihiro Kanamori, and Yuki Endo. Relighting humans in the wild: Monocular full-body human relighting with domain adaptation. In Computer Graphics Forum, vol. 40, pp. 205-216.Wiley Online Library, 2021.

Richard Zhang, Phillip Isola, Alexei A Efros, Eli Shechtman, and Oliver Wang. The unreasonable effectiveness of deep features as a perceptual metric. In Proceedings of the IEEE conference on computer vision and pattern recognition, pp. 586-595, 2018.

* cited by examiner

INPUT IMAGE

INVERSE SHADING MAP

ALBEDO IMAGE

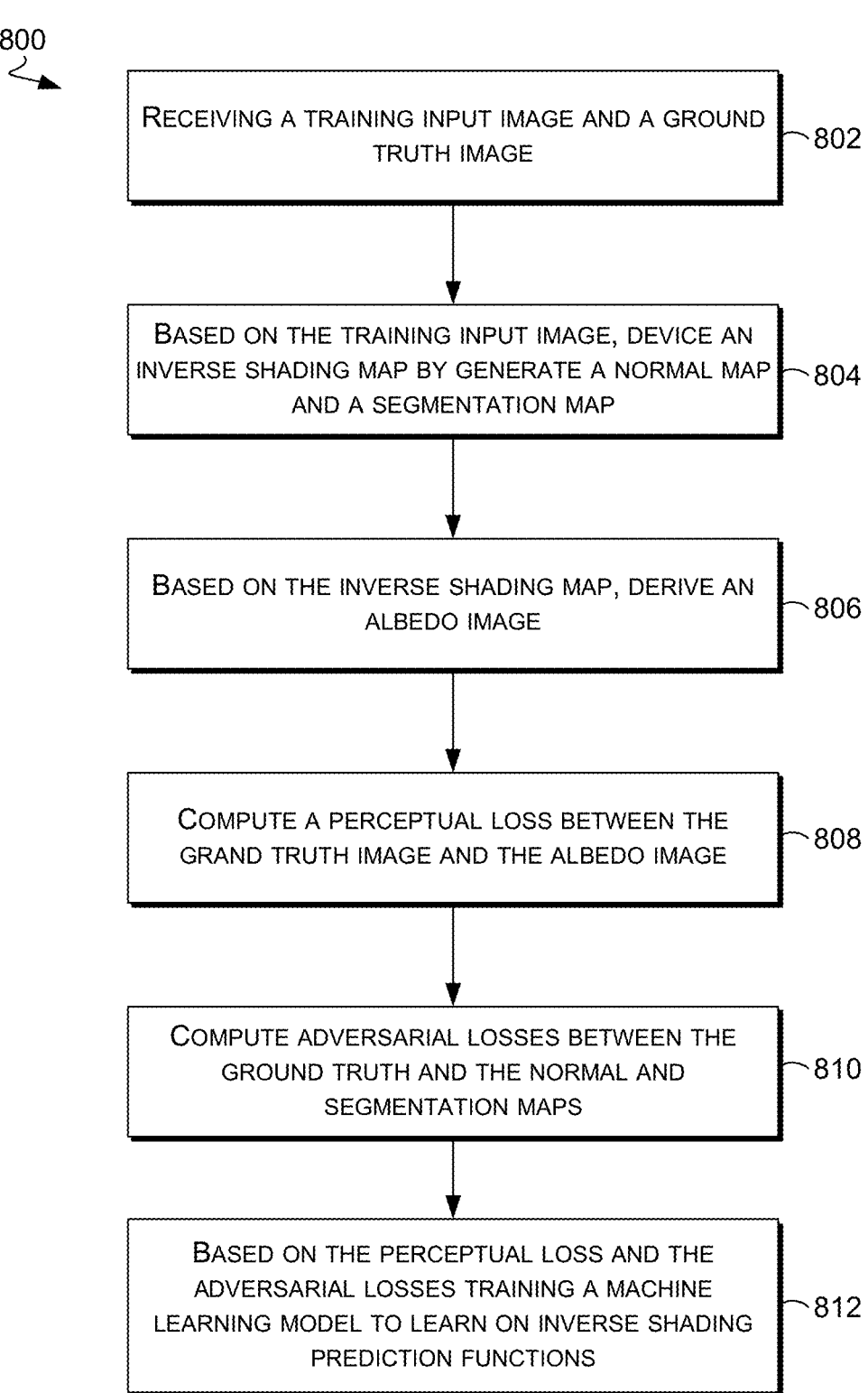

800

RECEIVING A TRAINING INPUT IMAGE AND A GROUND TRUTH IMAGE ～802

BASED ON THE TRAINING INPUT IMAGE, DEVICE AN INVERSE SHADING MAP BY GENERATE A NORMAL MAP AND A SEGMENTATION MAP ～804

BASED ON THE INVERSE SHADING MAP, DERIVE AN ALBEDO IMAGE ～806

COMPUTE A PERCEPTUAL LOSS BETWEEN THE GRAND TRUTH IMAGE AND THE ALBEDO IMAGE ～808

COMPUTE ADVERSARIAL LOSSES BETWEEN THE GROUND TRUTH AND THE NORMAL AND SEGMENTATION MAPS ～810

BASED ON THE PERCEPTUAL LOSS AND THE ADVERSARIAL LOSSES TRAINING A MACHINE LEARNING MODEL TO LEARN ON INVERSE SHADING PREDICTION FUNCTIONS ～812

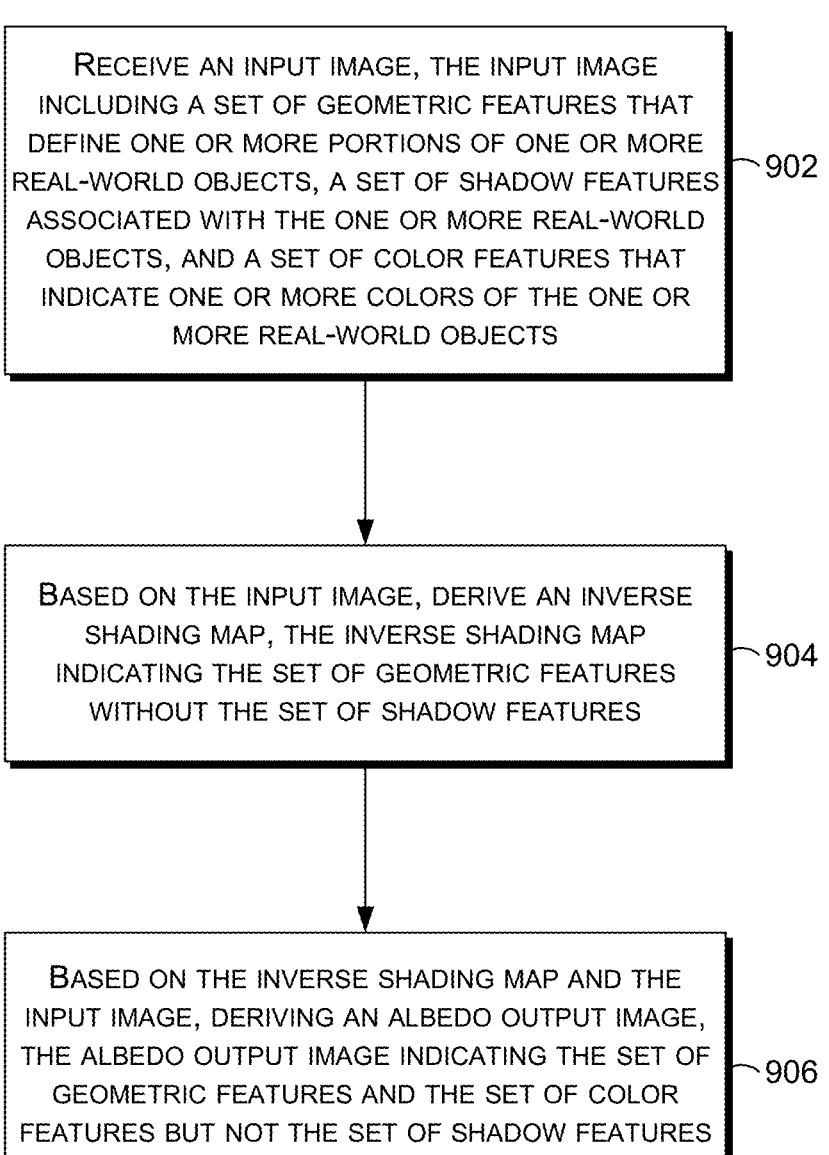

RECEIVE AN INPUT IMAGE, THE INPUT IMAGE
INCLUDING A SET OF GEOMETRIC FEATURES THAT
DEFINE ONE OR MORE PORTIONS OF ONE OR MORE
REAL-WORLD OBJECTS, A SET OF SHADOW FEATURES
ASSOCIATED WITH THE ONE OR MORE REAL-WORLD
OBJECTS, AND A SET OF COLOR FEATURES THAT
INDICATE ONE OR MORE COLORS OF THE ONE OR
MORE REAL-WORLD OBJECTS

902

BASED ON THE INPUT IMAGE, DERIVE AN INVERSE
SHADING MAP, THE INVERSE SHADING MAP
INDICATING THE SET OF GEOMETRIC FEATURES
WITHOUT THE SET OF SHADOW FEATURES

904

BASED ON THE INVERSE SHADING MAP AND THE
INPUT IMAGE, DERIVING AN ALBEDO OUTPUT IMAGE,
THE ALBEDO OUTPUT IMAGE INDICATING THE SET OF
GEOMETRIC FEATURES AND THE SET OF COLOR
FEATURES BUT NOT THE SET OF SHADOW FEATURES

ALBEDO RECONSTRUCTION BASED ON INVERSE SHADING PREDICTION

BACKGROUND

Various technologies render and modify media, such as photographic images. For example, some image editing applications perform automatic shadow removal in an image, relight objects in an image, or otherwise enhance an image. In an illustrative example, a 2-dimensional photograph image may contain pixels representing a human face in a real-world environment. However, due to the reflectance properties (e.g., shadows and highlights) in the real-world environment caused by the sun or other light source, there may be pixels in the photograph that represent the human face in some undesired manner. For instance, the photograph may contain pixels that indicate a shadow that covers half of the human face. In these instances, some existing technologies can, for example, estimate or predict the Red, Green, and Blue (RGB) pixel values of the half of the human face that is covered with the shadow such that the shadow can be effectively removed from the photograph and the human face will appear as though no shadows were ever cast.

SUMMARY

One or more embodiments are directed to deriving albedo (referred to herein as an "albedo output image") from an input image based on deriving an inverse shading map. "Albedo" is the intrinsic measure of shadow-free object appearance captured under diffused lighting (e.g., evenly radiated sunlight that minimizes the shadow and color variation). An "inverse shading map" is a data object that indicates a set of geometric features included in an input image, but without a set of shadow features and/or without a set of color (e.g., Red-Green-Blue (RGB) pixel value) features that are located in the input image. For example, an input image can be a photograph of a human face (i.e., the geometric features) with RGB values representing the color values of the face as well as pixels representing shadows (i.e., the shadow features) underneath the chin of the human face. The inverse shading map may be a black and white pixel value image that contains pixels representing the same human face without the RGB values and the shadows underneath the chin. The inverse shading map thus relies on the geometric space, rather than RGB space. Geometric space, for example, allows embodiments to capture the geometric features of a face (e.g., eyes, hair, head, ears, nose, mouth), as opposed to those geometric features' RGB details (e.g., color of hair, color of eyes, color of skin, etc.) or shading details (e.g., pixels representing shading over the skin).

In an illustrative example of deriving an inverse shading map, a U-NET Convolutional Neural Network (CNN) may take, as input, a normal map (e.g., depicts bumps and groves of objects in an input image) and a segmentation map (e.g., defines pixel-level boundaries of objects via panoptic segmentation) in order to predict the inverse shading map. Based on the inverse shading map and the input image, some embodiments then derive an albedo output image. The albedo output image indicates the set of geometric features and the set of color features in the input image but not the set of shadow features. For example, some embodiments can multiply the input image by the inverse shading map to derive the albedo output image, as described in more detail below.

Particular embodiments have the technical effect of improved accuracy, quality, and better generalization for albedo predictions, relative to existing technologies. For example, as described below with respect to the experimental results section, various embodiments of the present disclosure perform the best with the lowest Learned Perceptual Image Patch Similarity (LPIPS) score relative to generative and residual technologies. Various embodiments also enable improved albedo reconstruction quality compared to baseline technologies in terms of texture preservation, skin tone preservation, and shadow removal quality, as described in more detail below.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The present invention is described in detail below with reference to the attached drawing figures, wherein:

FIG. 8 is a flow diagram of an example process for training a machine learning model, according to some embodiments.

FIG. 9 is a flow diagram of an example process for deriving an albedo output image from an input image, according to some embodiments.

DETAILED DESCRIPTION

Overview

Figure 1:
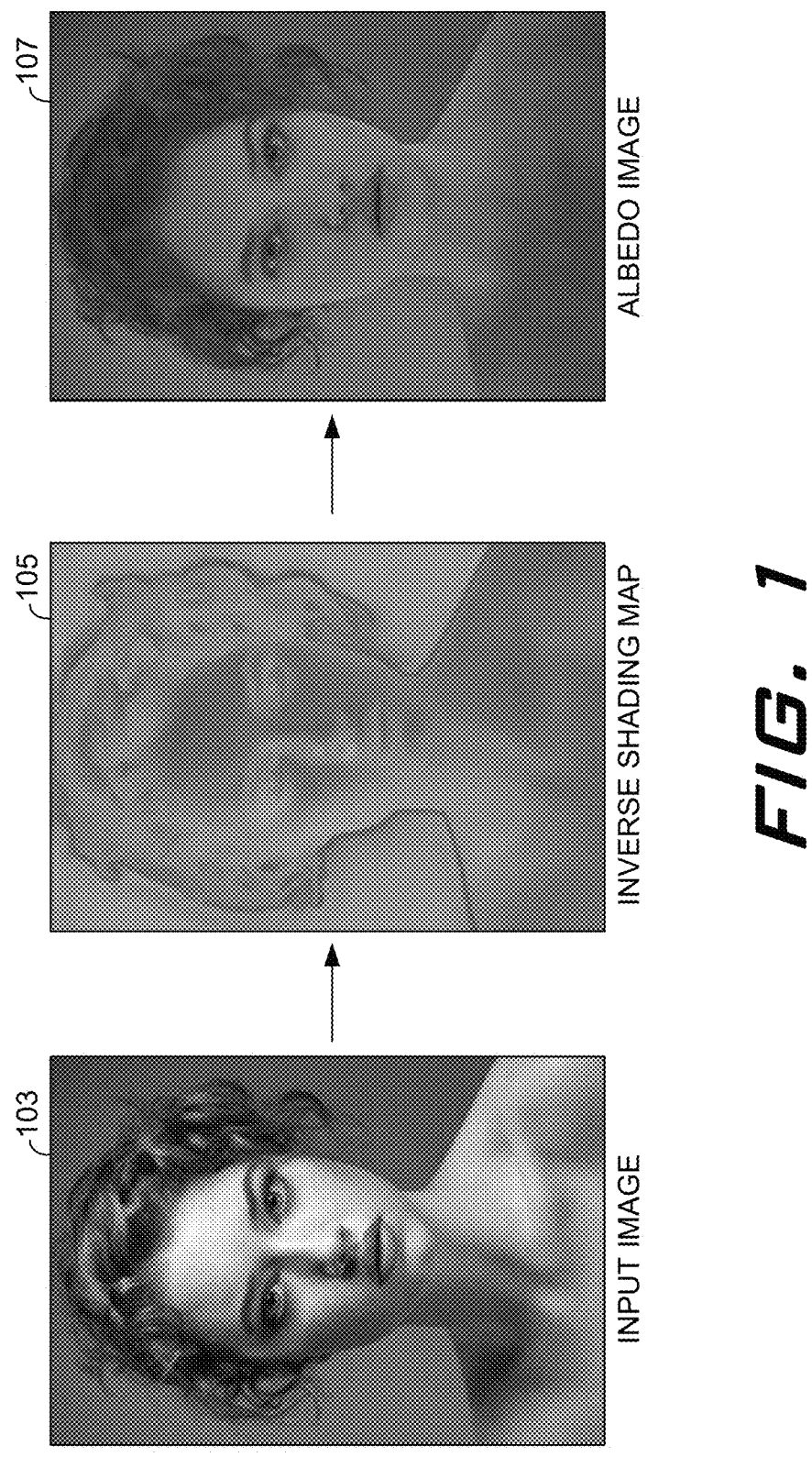
FIG. 1 is a schematic diagram illustrating, at a high level, how an albedo image is generated from a single input image and an inverse shading map, according to some embodiments.

Users often desire to edit a particular artwork, photograph, video, or other media content. In many instances, such editing is proceeded by the technical process of predicting an albedo of one or more real-world objects in an input image. "Albedo" is the intrinsic measure of the shadow-free object appearance captured under diffused lighting (e.g., evenly radiated sunlight that minimizes the shadow and color variation). For example, human albedo can be an image that contains pixels representing the geometric and RGB color features of a human face without any shadows or shading. Deriving the albedo enables a number of image editing applications such as automatic shadow removal, human relighting from a single image, and human image enhancement.

Existing technologies for generating albedo are deficient in terms of accuracy and quality. These technologies are broken up into two categories-a generative approach and residual prediction. The generative approach includes a generation function that learns to directly generate albedo from a single image by learning the RGB characteristics of the input image. Residual prediction technologies use a residual function that is designed to predict residual appearance that can be added to the input image to remove the shade and light. This means that a RGB difference between the albedo an input is initially computed and the albedo is reconstructed based on this difference. However, both of these technologies suffer from the loss of high-frequency details (e.g., repeated texture geometric patterns, such as lines in hair, skin pores, etc.), incorrect tone mapping (e.g., the tone of skin), and incomplete shade removal. This is mainly due to the significant ambiguity between the appearance (e.g., RGB values of hair, ears, etc.) and shade or shadows. For example, the model may have trouble distinguishing very dark lipstick from shade. This is also due to the lack of directly capturing geometric features and texture-level details (e.g., hair, nose, lips, patterns in hair, etc.) and distinguishing them from shadows. For example, some texture, such as grooves in human lips, are wrongly recognized by these technologies as a shade, and therefore, the texture is incorrectly removed in shadow removal applications.

Embodiments of the present invention provide one or more technical solutions to one or more of these technical problems, as described herein. In operation, various embodiments are directed to deriving an albedo output image based on deriving an inverse shading map. An "inverse shading map" as described herein is a data object (e.g., an image) that indicates a set of geometric features included in an input image, but without a set of shadow features and/or without a set of color (e.g., RGB pixel value) features that are located in the input image. For example, an input image may be a photograph of a human face with RGB values representing the color values of the face as well as pixels representing shadows underneath the chin of the human face. The inverse shading map may be a black and white pixel value image that contains pixels representing the same human face without the RGB values and the shadows underneath the chin. The inverse shading map thus relies on the geometric space, rather than RGB space. Geometric space, for example, allows embodiments to capture features of a face (e.g., eyes, hair, head, ears, nose, mouth), as opposed to those features' RGB details (e.g., color of hair, eyes, skin, etc.). The inverse shading map is typically predicted or estimated (e.g., via a confidence level pixel generation).

In operation, particular embodiments first receive an input image (e.g., a digital photograph), where the input image includes: a set of geometric features that define one or more portions of one or more real-world objects, a set of shadow features associated with the one or more real-world objects, and a set of color features that indicate one or more colors of the one or more real-world objects. Based on the input image, some embodiments then derive, via a first model, an inverse shading map. The inverse shading map indicates the set of geometric features without the set of shadow features and without the set of color features. In an illustrative example, the first model may be a U-NET Convolutional Neural Network (CNN), which takes, as input, a normal map (e.g., depicts bumps and groves of an input image) and a segmentation map (e.g., defines pixel-level boundaries of objects via panoptic segmentation) in order to predict the inverse shading map, as described in more detail below. Based on the inverse shading map and the input image, some embodiments then derive an albedo output image. The albedo output image indicates the set of geometric features and the set of color features but not the set of shadow features. For example, some embodiments can multiply the input image by the inverse shading map to derive the albedo output image, as described in more detail below.

Particular embodiments have the technical effect of improved accuracy and quality for albedo predictions, as described with respect to the experimental results section below. In the experiment, various embodiments demonstrate that predicting the inverse shading map achieves the best quality compared to existing methods qualitatively and quantitatively. In particular, various embodiments are more generalizable to "in-the-wild" (i.e., new) data with effective preservation of the high-frequency details and the skin tone; and more accurate shadow removal. Unlike the previous works, particular embodiments enable effective shadow removal with better preservation of the skin tone or other high-frequency details of real-world objects.

The goal of model image processing is to design a model that can learn general and predictive knowledge from training data, and then apply the model to new data (e.g., new test images) across different domains and image features, which is referred to as "generalization." Overfitting is an undesirable machine learning behavior that occurs when the machine learning model gives accurate predictions for training data but not for new data. In an illustrative example, overfitting can occur because a model may be trained only on images that contain a finite set of RGB values and reflectance properties. However, a testing or deployment input image may include RGB values or reflectance properties that models have not trained on. Accordingly, these existing technologies are inaccurate and are not generalized on predicting the albedo on image features or reflectance properties it has not trained on. For example, a model may incorrectly remove a texture of an object that is incorrectly interpreted as shade based on not having trained on the specific texture.

However, one technical solution is the deriving of the inverse shading map because the inverse shading map indicates geometric features and/or not RGB features. Thus, for example, various embodiments are more accurate and generalizable relative to existing technologies. Because various embodiment do not rely on RGB values for creating albedo, there is no concern with respect to the significant ambiguity between RGB values and shade. Moreover, the inverse shading map directly captures geometric features (e.g., via a semantic map and negative lighting) and texture-level details (e.g., via a normal map).

The technical solutions of implementing a normal map and/or segmentation map improves the quality and generalizability of albedo prediction because, unlike mere RGB values extraction, the normal map guides the geometric properties of the real world objects (e.g., human), such as grooves and patterns in hair, texture in skin, lines in lips, and the like. And there are typically no dramatic changes of the shading over the neighboring and similar surfaces. The segmentation map enables the appearance (e.g., RGB) consistency over the pixels that represent specific geometric features. For example, the pixels on the skin label should be represented by the same pixel value mask (e.g., a green color). In this way, for example, texture is correctly recognized as separate from shade or shadows, and therefore, the texture is not incorrectly removed.

In some embodiments, to improve albedo image quality, another technical solution is deriving the albedo output image based on generating the albedo output image via a Generative Adversarial Network (GAN). A GAN allows the most realistic albedo image to be generated via the feedback loop of a discriminator and generator, as described in more detail herein. Similarly, another technical solution is deriving the albedo output image is based on multiplying the input image by the inverse shading map, as described in more detail herein.

In some embodiments, to improve albedo accuracy, another technical solution is how a model is trained to derive the albedo image. Specifically, in some embodiments, a model is trained by learning an inverse shading prediction function based on minimizing a perceptual loss between a ground truth image and an albedo training image and minimizing a discrimination loss between the ground truth image and the albedo training image, as described in more detail below. In this way, accurate inverse shading maps will consistently be generated for a given input image, which causes accurate albedo images to be generated at the output.

FIG. 1 is a schematic diagram 100 illustrating, at a high level, how an albedo image is generated from a single input image 103 and the inverse shading map 105, according to some embodiments. In operation, given an input single image 103 of a person, particular embodiments predict an inverse shading map 105, which enables high-quality human albedo reconstruction—i.e., the albedo image 107. The reconstructed albedo can be used for the human relighting application, among other applications.

Accordingly, FIG. 1 describes generating high quality prediction of the human albedo 107, i.e., the shade-free appearance captured under diffused lighting, from a single image. While existing technologies have formulated this task as image generation or residual prediction problems, they suffer from losing details, color tone mismatch, and low de-shading quality due to the lack of discriminative power of the prediction model between shade and appearance (e.g., RGB level details). To address this problem, particular embodiments predict an inverse shading map 105, which is a geometric representation of the albedo image 107, which performs strong shade removal with effective preservation of the details (e.g., texture and other normal characteristics) and tone. Prediction of the inverse shading layer enables better reconstruction quality of the albedo compared to existing direct and residual prediction approaches. Predicted albedo can be utilized for many applications, such as human image relighting.

Figure 2:
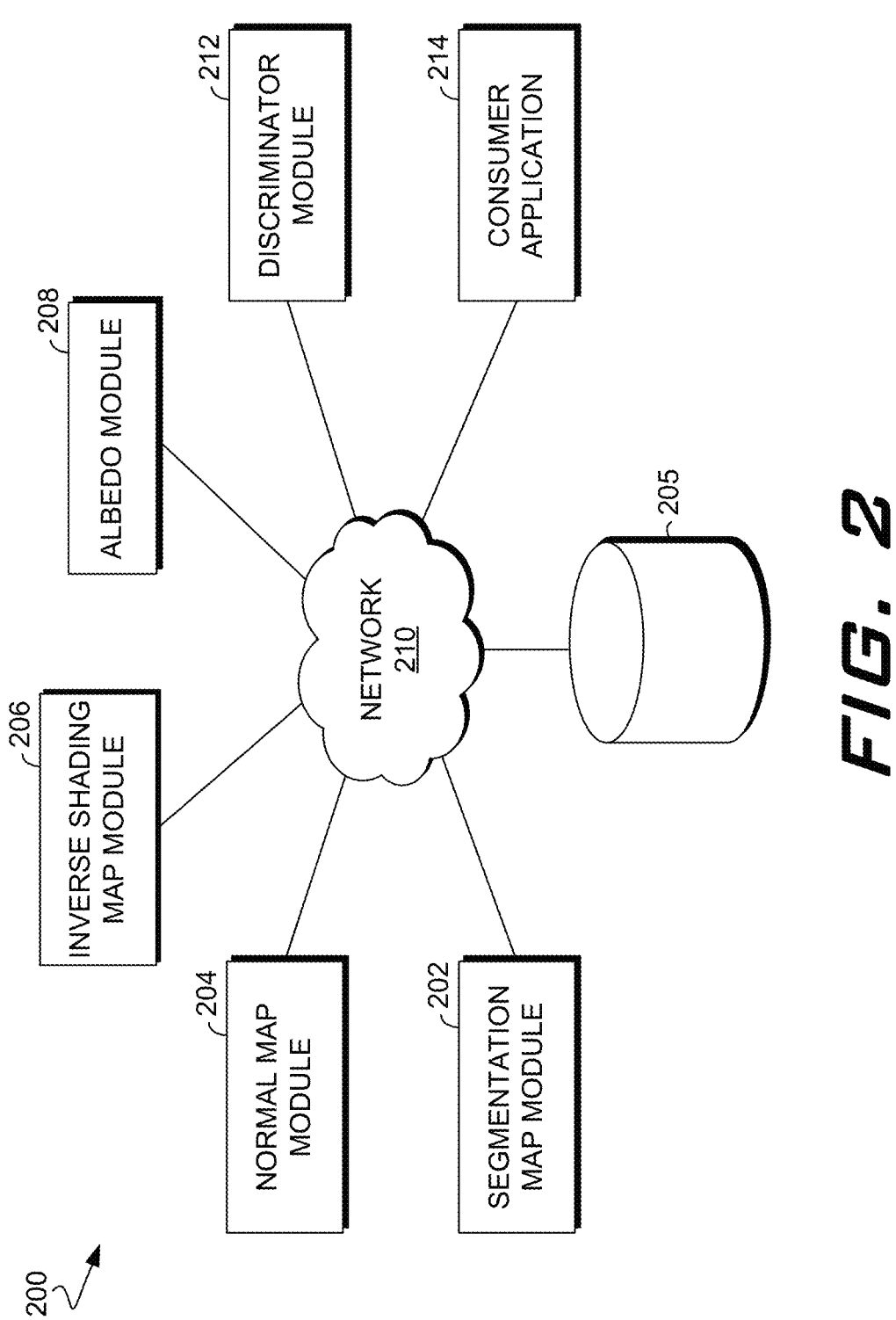
FIG. 2 is a block diagram of a computing system architecture in which aspects of the present disclosure are employed, according to some embodiments.

Referring now to FIG. 2, a block diagram is provided showing aspects of an example computing system architecture suitable for implementing an embodiment of the disclosure and designated generally as the system 200. The system 200 represents only one example of a suitable computing system architecture. Other arrangements and elements can be used in addition to or instead of those shown, and some elements may be omitted altogether for the sake of clarity. Further, many of the elements described herein are functional entities that may be implemented as discrete or distributed components or in conjunction with other components, and in any suitable combination and location. For example, some or each of the components of the system may be located within a single computing device (e.g., the computing device 1100 of FIG. 11). Alternatively, some or each of the components may be distributed among various computing devices, such as in a distributed cloud computing environment. In some embodiments, the system 200 and each of the components are located within the server and/or user device of FIG. 10, as described in more detail herein.

The system 200 includes network(s) 210, which is described in connection to FIG. 10, and which communicatively couples components of system 200, including a segmentation map module 202, a normal map module 204, an inverse shading map module 206, an albedo module 208, a discriminator module 212, a consumer application 214, and storage 205. The components of the system 200 may be embodied as a set of compiled computer instructions or functions, program modules, computer software services, individual computing devices, logic gates, or an arrangement of processes carried out on one or more computer systems.

The system 200 generally operates to derive an albedo map, according to some embodiments. The segmentation map module 202 is generally responsible generating a segmentation map of an input image. An "image" as described herein is a visual representation of one or more portions of the real world or other visual representation, such as digital artwork (e.g., a digital sketch or digital water painting). For example, an image can be a digital photograph, a digital image among a sequence of video segments, a graphic image file (e.g., JPEG, PNG, etc.), a picture (or sub-element of a picture), and/or a bitmap among other things. An "object" as described herein refers to visual data that represents a real-world or recognizable thing, such as a person.

In some embodiments, a segmentation map is generated via semantic segmentation. Semantic segmentation refers to the task of assigning and indicating (e.g., via a unique pixel-wise mask color or ID) each pixel to a particular class of a real-world object or background represented in an input image. For example, semantic segmentation functionality may define a first set of pixels as representing a "bird" and a second set of pixels as also representing a "bird," where both birds are represented by the same mask pixel value. In some embodiments, instance segmentation is additionally performed. Instance segmentation assigns and defines, with a unique identifier, each pixel to the instance of the real-world object it belongs to. For example, using the illustration above, the first set of pixels representing the first bird may be assigned an instance ID of 1 and a first color mask pixel value. Likewise, the second set of pixels representing the second detected bird may be assigned an instance ID of 2 and/or different mask color pixel value.

In some embodiments, the segmentation map is generated via panoptic segmentation. The combination of semantic segmentation and instance segmentation is what is referred to as panoptic segmentation. Specifically, in panoptic segmentation, all pixels of an image are uniquely assigned to one of the background classes (referred to as "stuff") or one of the object instances (referred to as "things"). For things, panoptic segmentation functionality thus classifies each pixel in an image as belonging to a particular class and identifies what instance of the class the pixel belongs to. For stuff, panoptic segmentation performs identical functionality as semantic segmentation.

Semantic segmentation is typically a deep learning algorithm that associates a label or category with every pixel in an image. The idea is to label each pixel of an image with a corresponding class of what is being represented. It is used to recognize a collection of pixels that form distinct categories. For example, a model can be trained to mask objects with pixel values of vehicles, pedestrians, traffic signs, pavement, or other road features. For example, a CNN can perform image-related functions at each layer and then down sample the image using a pooling layer (e.g., green). This process is repeated several times for the first half of the network. The output from the first half of this diagram is followed by an equal amount of unpooling layers (e.g., orange). In some embodiments, the segmentation map module 202 performs its functionality via MASK AI. Mask AI detects at least nine separate elements in a photo: people, skies, buildings, vehicles, water, plants, mountains, and both natural and artificial ground for the perfect mask.

In some embodiments, the segmentation map module 202 alternatively or additionally uses edge detection, which is an algorithm that finds the lines of contrast, or edges, in an input image, which typically identifies the boundaries of objects. In some embodiments, this algorithms first pre-processes the image to help differentiate any objects by converting the image into black and white values to better distinguish edges. Contours are the continuous boundary lines between areas of contrasting color or intensity. Unlike edge detection, finding contours will find prominent shapes within the image. Contours are typically a curve joining all the continuous points (along the boundary), having same color or intensity. The contours are a useful tool for shape analysis and object detection and recognition. Accordingly, once edges are detected and contours defined, embodiments split the image into background and foreground at the edges. In some embodiments, any contours that are under and/or over a size threshold to be the foreground, are removed or considered the background and the remaining contours will be considered the foreground. In yet another example, some embodiments use a KNN-based (e.g., a SIOX) algorithm. These models assume that foreground and background have different colors, and models the segmentation task as a (supervised) classification problem, where the training data includes examples of foreground pixels and examples of background pixels, where the training is based both on color of the pixels and/or the actual objects (or pixel/line orientation). For example, a model can learn that most backgrounds are green in color or are associated with specific features, such as trees, sky, sun, clouds, and the like. Based on such training, particular embodiments classify the rest of the pixels according to color or features.

In some embodiments, the segmentation map module 202 alternatively or additionally uses an object detector for detecting or classifying one or more objects in an input image. The object detector performs object detection functionality to detect one or more objects in an image. In an illustrative example of object detection functionality, particular embodiments use one or more machine learning models (e.g., a Convolutional Neural Network (CNN)) to generate a bounding box that defines the boundaries and encompasses a computer object representing a feature (e.g., a car, the sky, a building, a person, etc.) in an image. These machine learning models can also generate a classification prediction that the computer object is a particular feature. In computer vision applications, the output of object detection can be encompassed by a bounding box. A bounding box encompasses the boundaries of the object in terms of the position (e.g., 2-D or 3-D coordinates) of the bounding box (and also the height and width of the bounding box). For example, the bounding box can be a rectangular box that is determined by its x and y axis coordinates. This gives object recognition systems indicators of the spatial distinction between objects to help detect the objects in images. In an illustrative example, on an image, a first bounding box can be generated over a cat in an image and labeled as "cat", a second bounding box can be generated over a dog and labeled "dog", and a third bounding box can be generated over a mountain objects and labeled as "mountain."

In some embodiments, one or more machine learning models can be used and trained to generate tighter bounding boxes for each object. In this way, bounding boxes can change in shape and confidence levels for classification/prediction and can be increased based on increased training sessions. For example, the output of a CNN or any other machine learning model described herein can be one or more bounding boxes over each feature of an image (corresponding to a feature in an image), where each bounding box includes the classification prediction (e.g., this object is a building) and the confidence level (e.g., 90% probability).

Alternatively, in some embodiments the segmentation map module 202 need not perform object detection functionality, but can perform image classification, object recognition, keypoint detection, or other functionality where different features or objects are identified in an image. For example, with respect to image classification, embodiments can perform pixel-based classifications (e.g., minimum-distance-to-mean, maximum-likelihood, and minimum-Mahalanobis-distance) or object-based classifications to classify an entire image (without determining location information, such as a bounding box). For example, some embodiments perform pre-processing functionality, such as converting the image into a vector or matrix, where each value (e.g., an integer or float) represents a corresponding pixel value in the image. In some embodiments, such as in K-Nearest Neighbor (KNN) use cases, particular embodiments determine the distance between such vector and other vectors that represent training images, where the closest vectors indicate that a set of pixels (or the entire image) corresponds to a certain class.

Continuing with FIG. 2, the normal map module 204 is generally responsible for deriving a normal map from the input image. A "normal map" indicates the dents, bumps, and/or pores and the corresponding depth of the dents/bumps/pores an object has in an input image. Normal maps or objects thus typically indicate the microstructure texture of a given object in an input image. Normal maps are typically saved in a Red-Blue-Green (RGB) format, and contain its directional information in X, Y, and Z axes. In an illustrative example, a normal map may indicate pores in the skin, hair texture, lip lines, eye lashes, dimples, nose shape, or the like.

In some embodiments, the normal map module 204 uses a machine learning model to predict the normal map. In some embodiments, such prediction is based on training a machine learning model with images rich in texture. This allows the normal map module 204 to accurately identify which portions of an input image indicate particular texture features based on learning weights of texture features of training images. For example, the machine learning model may be a deep neural network (e.g., a U-NET) to perform the functionality of the normal map module 204.

The inverse shading map module 206 is generally responsible for deriving an inverse shading map, such as the inverse shading map 105 as described with FIG. 1. In some embodiments, a machine learning model (e.g., a U-NET) takes the segmentation map (as derived by the segmentation map module 202) and the normal map (as derived by the normal map module 204) as input to produce the inverse shading map, as described in more detail below.

The albedo module 208 is generally responsible for generating an output albedo image (e.g., the albedo image 107) using the inverse shading map as input. Accordingly, the albedo image represents a reconstruction of the input image, except that there are no (or fewer) pixels indicating shade or shadows. The albedo module 208 additionally restores the RGB color values from the input image, as well as generate additional RGB color values from portions of the input image that were covered by shadows, shading, highlights, or the like, which match the RGB color values that were not covered by the shadows, shading, highlights, or the like.

In some embodiments, the deriving of the albedo output image is further based on using a Generative Adversarial Network (GAN), as described in more detail below. In some embodiments, the deriving of the albedo output image is further based on multiplying the input image by the inverse shading map, as described in more detail below. The discriminator module 212 is generally responsible for refining the generation of the albedo output image via a GAN so that the output albedo image appears more realistic or has better quality, as described in more detail below.

Consumer applications 214 generally refers to one or more computer applications or services, such as online/cloud applications or locally stored apps that consume, include, or utilize some or each of the components of the system 200. In particular, a consumer application 214 may receive or upload an input image and provide an albedo output image from the input image, as described within the system 200. In some embodiments, a consumer application 214 may utilize a presentation component to cause presentation of visual results. Examples of consumer applications 214 may include, without limitation, computer applications or services for presenting media and/or editing media (e.g., Adobe Dimension®, Substance Painter®, Adobe® Photoshop®, Adobe After Effects®, and Adobe Premiere®), or other computer applications that include such functionality, such as social media service applications (e.g., PINTEREST, FACEBOOK, etc.), email, messaging, chat, or any other web application, plugin, extension, or locally stored application.

Storage 205 generally stores information including data (e.g., training datasets, input images, segmentation maps, normal maps, inverse shading maps, albedo output images, etc.), computer instructions (for example, software program instructions, routines, or services), data structures, and/or models used in embodiments of the technologies described herein. In some embodiments, storage 205 represents any suitable data repository or device, such as a database, a data warehouse, RAM, cache, disk, RAID, and/or a storage network (e.g., Storage Area Network (SAN)). In some embodiments, storage 205 includes data records (e.g., database rows) that contain any suitable information described herein. In some embodiments, each record is called or requested and returned, over the computer network(s) 210, depending on the component needing it, as described herein.

Figure 3:
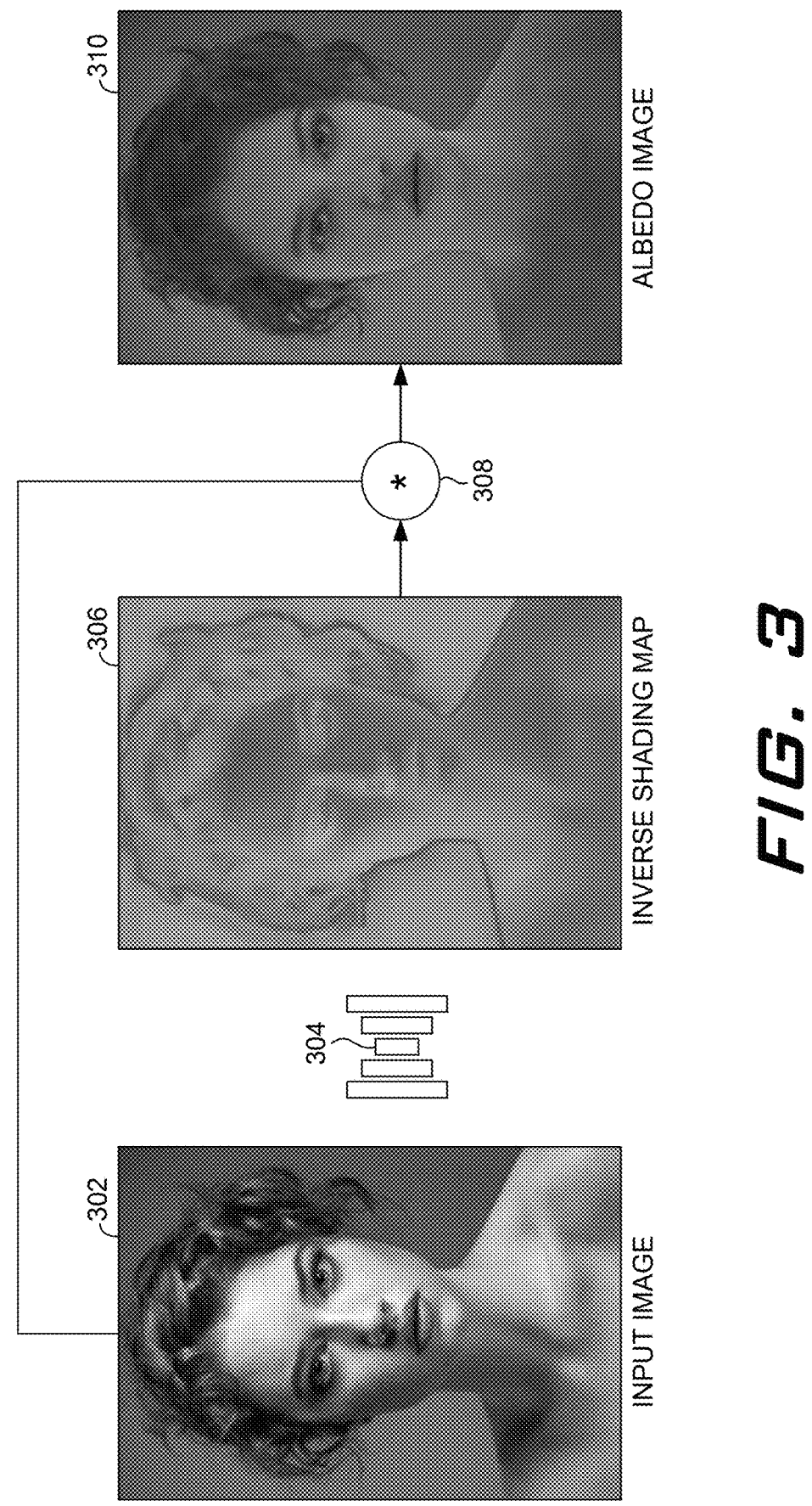
FIG. 3 is a schematic diagram illustrating how an albedo output image is generated, according to some embodiments.

FIG. 3 is a schematic diagram illustrating how an albedo output image (A) 310 is generated, according to some embodiments. As described herein, various embodiments are directed to predicting the albedo A in the geometry space. A neural network 304 (e.g., a U-NET) is designed to predict the inverse shading map 306, which is directly multiplied 308 by the input image 302 in a way that removes the shade and/or lighting to reconstruct human albedo. In some embodiments, one key assumption is that the inverse shading is on geometry space (and not appearance or RGB space), so thus its representation is completely decoupled from the appearance, highly suppressing the appearance ambiguity that existing technologies have trouble with.

Given an input image 302 of an object captured under novel shading and lighting, particular embodiments reconstruct the albedo 310 of the object by predicting the inverse shading S 303 of the shading in the input I 302. Albedo prediction has been often formulated by existing technologies as a data-driven approach as follows:

$$A \leftarrow f(I; \omega_f). \tag{1}$$

where f is the data-driven function that learns many data to directly predict human albedo $A \in R^{w \times h \times c}$ from an image $I \in R^{w \times h \times c}$ captured under novel lighting and shade where w, h and c are the width, height, and channel of the image. However, its learned weight of is often biased to a specific data distribution, so thus, less generalizable to unconstrained scenes, producing weak shadow removal results.

Inspired by the previous findings about residual prediction models, which is more generalizable than the direct generation method, some existing technologies reformulate the albedo prediction problem as the residual prediction task g as follows:

$$A = I + \Delta A = I + g(I; \omega_g) \tag{2}$$

where $\Delta A \in R^{w \times h \times c}$ is the residual appearance that removes the shade and lights in I. Unlike dynamic appearance in RGB space, $\Delta A$ is in the normalized space, and therefore, its learned weight $\omega_g$ may be generalizable, i.e., the normalized residual is invariant to the RGB color. However, this residual prediction still suffers from artifacts failures, e.g., loss of details, when tested on unseen data due to the significant confusion between intrinsic object (e.g., human) appearance (e.g., RGB features) and extrinsic shadow, i.e., some textures are recognized as shadows.

To overcome such appearance ambiguity, particular embodiments model such shading residual in the geometry space. For example, given I (i.e., the input image 302), a shading removal function s predicts the inverse shading (i.e., the inverse shading S 306):

$$A = I * S^{-1} = I * s(I; w_s), \tag{3}$$

where $S^{-1} \in R^{w \times h \times c}$ is the inverse shading layer 306 that removes the shading by the multiplication 308 with the input image 302. The inverse shading $S^{-1}$ (i.e., 306) is completely decoupled from the appearance, and therefore, the high-frequency texture can be effectively preserved, unlike existing technologies.

Continuing with FIG. 3, in some embodiments, the U-NET 304 performs its functionality as follows: the input image 302 is first fed to the U-Net 304, which extracts one or more tiles (e.g., sections) from the input image 302 and performs a convolution operation followed by a non-linear activation function ("ReLU") to contract the kernels into 64 channels and 5×5 (and/or 3×3) pixels. The 5×5 and 3×3 pixel resolutions represent the sizes of the kernel of the convolution and not the spatial (image) resolution of the output tile. The output of the convolution has the same spatial resolution as the input (via the padding operation). The convolution operation (or convolutional layer) generates one or more feature maps, which each represent a feature (e.g., a set of pixels representing a nose, lips, or eyes) of the input image 302. There may be various features of an image and thus there may be various linearly stacked feature maps for a given image. A feature map is also an array of values that represent sets of pixels and weights where a value is weighted higher when it matches a corresponding pixel or set of pixels in the corresponding section of the input image. The convolution layer includes an algorithm that uses each feature map to scan or analyze each portion of the input image 302. Accordingly, each pixel of each feature map is compared and matched up against a corresponding pixel in each section of the input image and weighted according to similarity. In some embodiments, the convolutional layer performs linear functions or operations to arrive at the feature map by multiplying each image pixel value with its own feature value and then performing a summation function of each product. In various embodiments, in response to the convolution operations and ReLU being computed, a batch normalization (BN) is performed, which re-centers and re-scales the resulting set of pixels.

In various embodiments, a max pooling function is then performed, for which there are 128 channels and 256×256 pixels. Max pooling (i.e., the max pooling layer) reduces the resolution or compresses each feature map by picking a window size (i.e., a quantity of dimensional pixels that will be analyzed in the feature map) and selecting the maximum value of all of the values in this window of the feature map as the only output for the modified feature map. For example, the max pooling layer can compress the 512×512 pixels described above to 256×256 via a max pooling operation.

In various embodiments, additional convolutional, non-linear activation functions, and max pooling operations (also known as "down sampling" or "contraction" or "encoder" operations) can continue. For example, a 3×3 convolutional operation, ReLU, and BN operation, can be followed by another 3×3 convolutional operation, ReLU, and BN operation, followed by another max pooling operation at 2×2 to arrive at 310. Then up sampling (also known as "expansion" or "decoder" operations) can be performed. For example, n×n can be up sampled to 2n×2n, after which there is a 3×3 convolutional operation, ReLU, operation, and BN operation (which is repeated). Then additional up sampling can occur, followed by 1×1 convolutional operation, which is a 512×512 pixel representation that reflects the tile. There may also be skip connection functionality. "Skip connections" are a concatenation of features from the encoder.

The output of encoder and decoder functions is the predicted inverse shading S map 306. Using U-Nets are suitable for input image to albedo tasks because embodiments translate the input image 302 to the inverse shading S map 306 without the shadows and/or highlights of the input image 302.

The Delighting U-Net 300 uses the ground truth albedo 322. The loss function 324 is a pixel wise distance between the predicted albedo 320 and the ground truth albedo 322 (or more precisely, the feature vectors that represent the predicted albedo 320 and the ground truth albedo 322). The ground truth albedo 322 is generated at the data generation step before training, which is described in FIG. 4 in more detail below. In various embodiments, the inverse shading prediction is trained in a self-supervised way by learning to perform inverse reconstruction of the original image from the ground truth albedo. Particular embodiments enable the inverse shading prediction function s using a neural network whose training details are described in FIG. 4 below.

Figure 4:
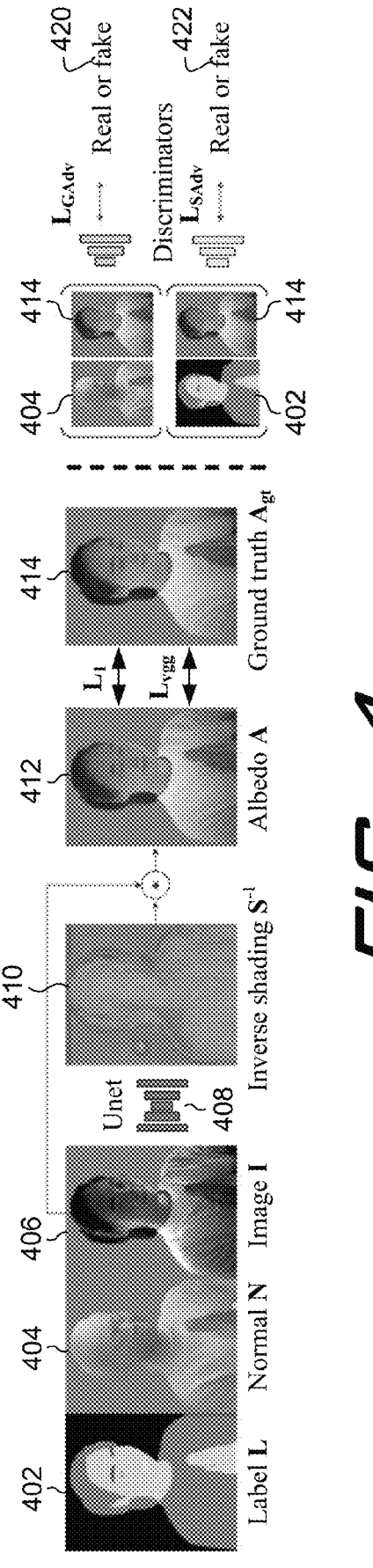
FIG. 4 is a schematic diagram illustrating how training a model to predict albedo occurs, according to some embodiments.

FIG. 4 is a schematic diagram illustrating how training a model to predict albedo occurs, according to some embodiments. However, it is understood that at least some of the functionality described with respect to FIG. 4 (e.g., the deriving of an inverse shading map via normal and segmentation maps) can additionally or alternatively be applied in deployment or runtime contexts (i.e., after a model has been trained, fine-tuned, and/or tested). An existing U-Net architecture 408 is used to learn the inverse shading prediction function s for the inverse shading map 410. In practice, particular embodiments further utilize the surface normal $N \in R^{w \times h \times c}$ (i.e., the normal map 404) and human label maps $L \in R^{w \times h \times c}$ (i.e., the segmentation map 402) to improve the quality and generalizability of the albedo prediction 412:

$$S^{-1} = I * s(I, N, L; ws). \tag{4}$$

The surface normal N 404 guides the geometric property of the human, e.g., there exists no dramatic change of the shading over the neighboring and similar surfaces, and the human label maps L 402 enables the appearance consistency over the pixels, e.g., the pixels on the skin label should be similar. In some embodiments, the human label maps L 402 is derived by the segmentation map module 202, as described with respect to FIG. 2. Similarly, in some embodiments, the normal map N 404 is derived from the normal map module 204, as described with respect to FIG. 2. In some embodiments, the inverse shading map 410 represents the output produced by the inverse shading map module 206 of FIG. 2.

Particular embodiments use ADOBE's internal surface normal and human segmentation methods to generate the segmentation map 402 and the normal map 404. Particular embodiments learn s by minimizing the following loss:

$$L = L_1 + \lambda_{vgg} L_{vgg} + \lambda_{GAdv} L_{GAdv} + \lambda_{SAdv} L_{SAdv}, \tag{5}$$

where $\lambda$ controls the weight of each loss. $L_1$ measures the difference between the Albedo prediction A 414 and ground truth A 414: $L_1 = \|A - A_{gt}\|$. $L_{vgg}$ is designed to penalize the difference of $A_{gt}$ (i.e., 414) and A (i.e., 412) from their VGG features space to capture both high-frequency details and semantic validity.

$\lambda$GAdv and $\lambda$SAdv are the conditional adversarial losses (computed via a GAN) to evaluate the plausibility of the geometry and semantics, respectively, where particular embodiments use {Agt, G} and {Agt, L} as real and {A,G} and {A,L} as fake, as illustrated in FIG. 4. That is, normal map 404 is compared with the ground truth 414 to make the real or fake determination 420. Further, the segmentation map 402 is compared with the ground truth 414 to make the real or fake determination 422. Real and fake determinations as they relate to GANS are described in more detail below.

Figure 5:
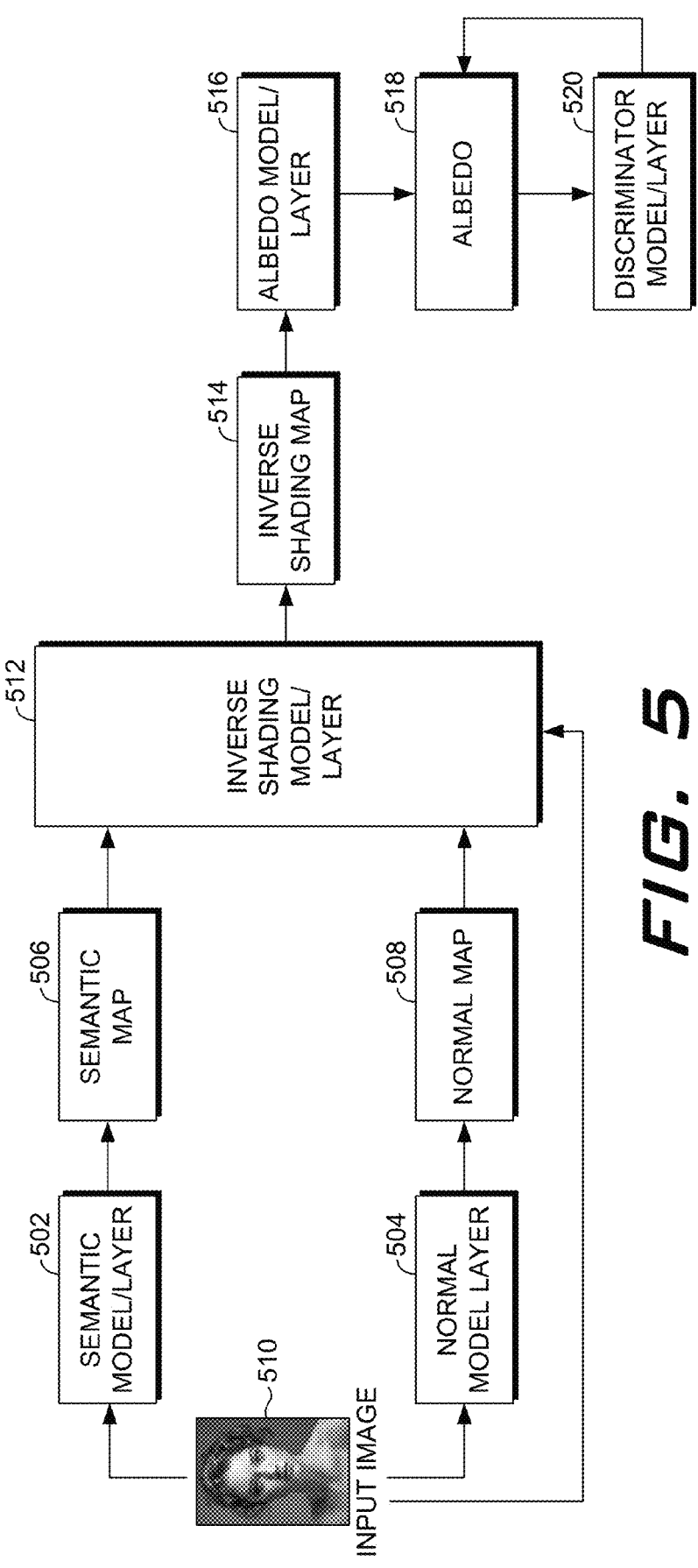
FIG. 5 is a schematic diagram illustrating different models or layers, each of their inputs, and each of their outputs, according to some embodiments.

FIG. 5 is a schematic diagram illustrating different models or layers, each of their inputs, and each of their outputs, according to some embodiments. A "model/layer" as illustrated in FIG. 2 represents a respective machine learning model (e.g., of an ensemble of models), or a different layer within a single machine learning model, such as an input layer, hidden layers, or and output layer of a neural network. In some embodiments, the semantic model/layer 502 represents the segmentation map module 202 of FIG. 2, the normal model/layer 504 represents the normal map module 204, the inverse shading model/layer 512 represents the inverse shading map module 206, the albedo model/layer 516 represents the albedo module 208 of FIG. 2 and/or the discriminator model/layer 520 represents a GAN, such as described with respect to 420 and 422 of FIG. 2.

At a first time, the semantic model/layer 502 takes the input image 510 as input to produce or predict the semantic map 506 of the input image 510. For example, a model trained to perform pixel-wise panoptic segmentation can be trained to superimpose pixels over various images indicating boundaries of one or more objects and based on such training, generate a semantic map to identify each component of one or more objects of the input image 510. For example, as illustrated in the label L 402, the hair is defined by blue pixels, the face is defined by green pixels, the shirt is defined by red pixels, and the rest of the skin is defined by yellow pixel values. The normal model/layer 504 additionally takes the input image 510 as input to produce or predict the normal map 508, which indicates the texture of different features of the input image 510. In some embodiments, the normal model/layer 504 is trained on various images that represent grooves, bumps, or other texture so that the model can learn X, Y, and Z directional RGB pixel texture given particular surfaces and/or reflectance properties. For example, given a ground truth image of a face, the model 504 can minimize a perceptual loss between the ground truth image and a training image, such that the model sets corresponding weights for learning that the face in the input image 510 has particular bumps at the lips, hair, and chin.

The inverse shading model/layer 512 takes, as input, the semantic map 506, the normal map 508, and the input image 510 to produce or predict the inverse shading map 514, as described, for example, with respect to the inverse shading S 306 of FIG. 3. The albedo model/layer 516 takes, as input, the inverse shading map 514, to produce or predict the albedo 518 (e.g., an albedo image). In some embodiments, the albedo model/layer 516 is trained on various images that include shading, inverse shading maps, and/or reflectance properties (e.g., highlights) so that it can learn how to remove shading and lighting while preserving geometric properties (via the normal and segmentation maps), as described, for example, with respect to the perceptual loss of FIG. 4. The discriminator model/layer 520 takes, as input, the albedo 518, in order to discern whether the albedo is real or fake (e.g., via a GAN) and re-generate the albedo if and until the albedo 518 is determined to be real in order to improve the output albedo image quality, as described herein.

Figure 6:
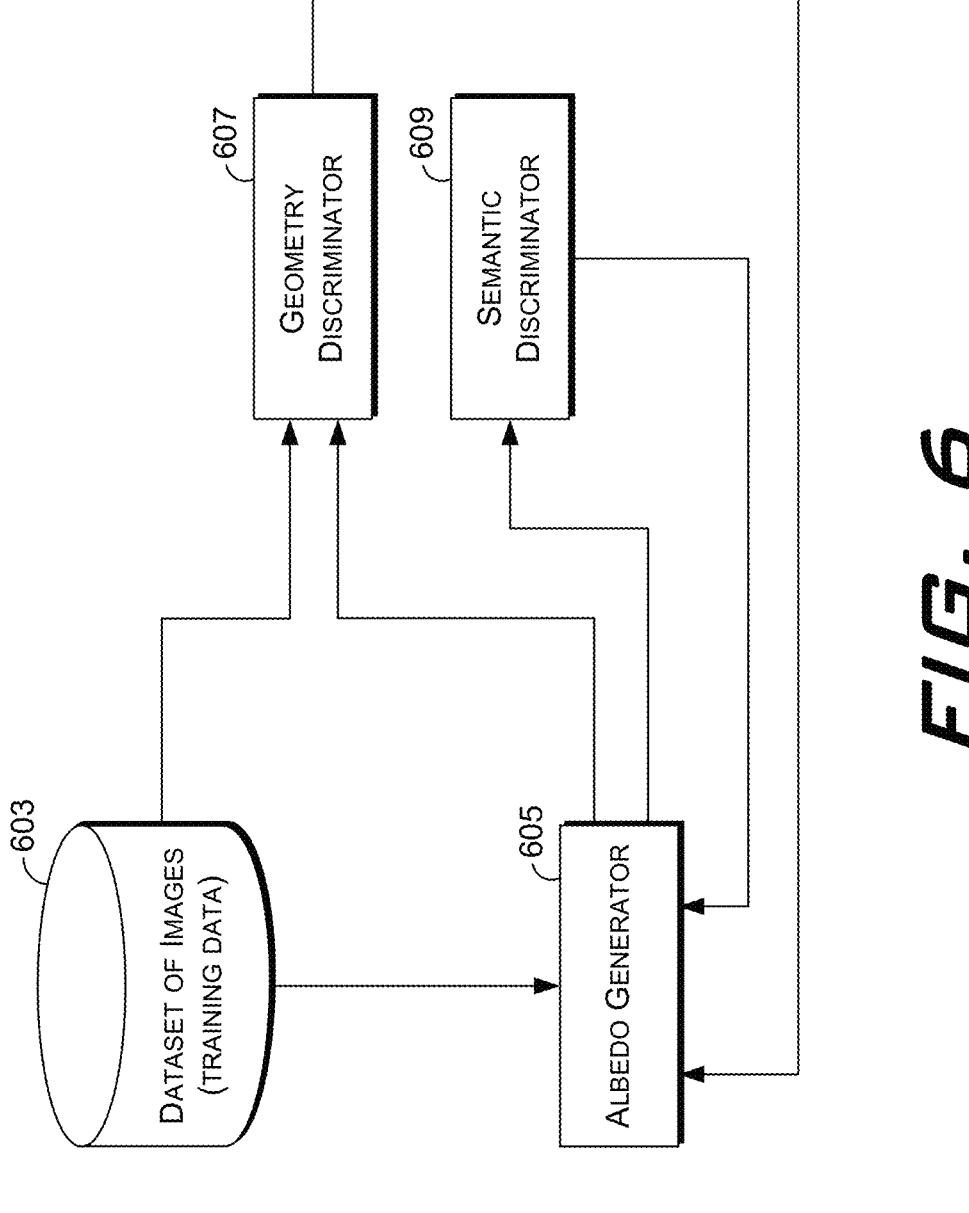
FIG. 6 is a schematic diagram of a Generative Adversarial Network (GAN) for use in refining an albedo image, according to some embodiments.

FIG. 6 is a schematic diagram of a Generative Adversarial Network (GAN) 600 for use in refining an albedo image, according to some embodiments. The GAN 600 includes a set of neural networks—the albedo generator 605 (a first neural network), a geometry discriminator 607 (a second neural network), a semantic discriminator 609 (a third neural network) and a dataset of target image(s) 603. In some embodiments, the GAN 600 represents or includes the functionality as described with respect to the real or fake determinations 420 and 422 of FIG. 4, the discriminator model/layer 520 of FIG. 5, or the discriminator module 212 of FIG. 2.

The albedo generator 605 is generally responsible for iteratively generating synthetic or "fake" albedo images until a fake image is selected for the output by meeting one or more certain thresholds set by the geometry discriminator 607 and the semantic discriminator 609. In some embodiments, the albedo generator 605 includes or represents the albedo module 208 of FIG. 2. The albedo generator 605 iteratively and incrementally generates albedo images until it fools (e.g., is within a threshold pixel value/orientation threshold set by) each of the discriminators 607 and 609, at which point the corresponding image is outputted, such as the albedo image 310 of FIG. 3. For example, the albedo generator 605 can take, as input, an image (e.g., the input image 302) within the dataset of target image(s) 603 and then responsively generate an inverse shading map and corresponding albedo image as. In some embodiments, the albedo generator 605 alternatively or additionally generates intermediate maps that are used to build albedo. For example, the albedo generator 605 may generate the normal map 404 and the segmentation map 402 of FIG. 4 so that these individual maps can be compared to the ground truth 414 via the discriminators 607 and 609.

In generating these fake images, the albedo generator 605 learns the distribution of classes or clusters that represent specific albedo patterns or textures given the corresponding regions of the dataset of images 603. For example, the albedo generator 605 is trained on the dataset of images 603, where images can be labeled as "fake" (1) or "real" (0) and/or "correct albedo" (1) or "not correct albedo" (0). The albedo generator 605 can then learn feature associated with each of these labels so that it knows how to iteratively apply albedo to an image or otherwise generate seamless images (e.g., via blending) (so that reconstructing albedo does not appear fake). In some embodiments, the dataset of images 603 includes images with shading or reflectance properties so that a model can learn to generate albedo.

In some embodiments, the albedo generator 605 is built by selecting an input Z, which may be a random number between 0 and 1 (e.g., 0.7). This input may be a feature vector or other tensor that comes from a fixed distribution. Z may then be multiplied by each learned weight, which indicates the learned feature or pixel values and pixel value orientations (coordinates) for the particular albedo results and/or whether or not the albedo is real. In some embodiments, each pixel in an image is represented by a value (e.g., from 0 to 1), where the value itself and the orientation of the pixels are representative of whether or not there are certain albedo results or images present (and/or how much data representing the albedo results or images is present). In this way, the albedo generator 605 can incrementally, for example, adjust individual pixel values (along with sigmoid) until these values fool the discriminators 607 and 609 by generating pixel values and/or positions within an acceptable threshold or range that the discriminators 607 and 609 are aware of. At a high level, what this means is that a well-trained albedo generator 605 will always generate images with real looking albedo such that the objects represented in the image appear as though no shadows, shade, or reflectance properties every existed, but may do so with varying degrees of pixel values.

In some embodiments, the geometry discriminator 607 is a discriminator that is generally responsible for determining, predicting, or estimating whether the albedo image generated by the albedo generator 605 are real or fake based on comparing these images to the dataset of target images 603 (e.g., ground truth images). In some embodiments, such functionality represents the real or fake determinations 420 of FIG. 4. For example, the geometry discriminator 607 may compare the normal map 404 to the ground truth map 414 to determine if the normal map 404 is real or fake.

In some embodiments, the semantic discriminator 609 is a discriminator that is generally responsible for determining, predicting, or estimating whether the albedo image generated by the albedo generator 605 is real or fake based on comparing these images to the dataset of target images 603 (e.g., ground truth images). In some embodiments, such functionality represents the real or fake determinations 422 of FIG. 4. For example, the semantic discriminator 609 may compare the segmentation map 402 map to the ground truth map 414 to determine if the segmentation map 402 is real or fake.

In some embodiments, the determination of whether an image is real or fake via the discriminators 607 or 609 includes determining whether the pixels are outside of an orientation, position, or pixel value threshold. For example, if a first set of pixel values representing an albedo result is applied, by the albedo generator 605, to an image and placed next to a second set of pixels representing the non-shaded/ highlighted region (representing original non-shaded RGB color values), the first set of pixels can be outside of a threshold relative to the second set of pixel values, which may indicate, for example, that a human face is a different color or sharpness in the newly added albedo pixels relative to the original colored non-shaded pixels. Responsively, the semantic discriminator 609 can thus determine that the image is fake (e.g., based on the images in the dataset of target images 603 differing over a distance threshold).

Alternatively, or additionally, in some embodiments, the determination of whether an image (or inpainting result) is real or fake includes determining whether a pixel value is outside of a resolution threshold (e.g., relative to other pixels of the same image or based on the images in the dataset of target images 603 differing over a distance threshold). For example, pixel values representing an albedo result and as generated by the albedo generator 605 may be grainy at a low resolution, whereas the same ground truth image may be clear at a high-resolution value. Accordingly, the semantic discriminator 609 can determine that the albedo results are present or the image is otherwise fake.

In some embodiments, the discriminators 607 or 609 adds values representing individual pixel values at a specific orientation indicative of albedo generation and subtracts values representing pixel values at a specific orientation indicative of non-albedo. Various embodiments can then set any suitable threshold value to indicate whether a certain images are real/not real or whether albedo is present. For example, if the summed values are greater than or equal to 1, albedo may be present relative to values less than 1, which may mean that albedo is not present. In neural networks, and in some embodiments, each neural network node represents a particular pixel of an image and its value. In this way, and using the example above, all the pixel values can be multiplied or added by plus 1 (e.g., albedo present) or −1 (e.g., albedo not present) for a final aggregation score. Some embodiments use a sigmoid function (a function that converts high numbers to numbers close to 1 and low numbers to numbers close to 0) to get a sigmoid of the output, which represents the probability that albedo has been applied/ whether the image is real or fake.

Various embodiments train the GAN 600 to get the best possible weights (e.g., values that closely resemble pixel values of realistic albedo). This can be done via an error function (e.g., log loss or cross entropy loss), which a mechanism to tell the GAN 600 how it is performing. If the error is large, the GAN 600 is not performing well and therefore performs more training epochs until it improves. For instance, if the ground truth represented by a label 1 indicative of a certain albedo results, and a prediction is made of 0.1, when it was supposed to be around 1, retraining may occur.

In some embodiments, training occurs via backpropagation by calculating the prediction and then error of that prediction. Then embodiments can take the derivative of the error based on the weights using, for example, the chain rule. This tells the model the quantity or magnitude each weight should be adjusted in order to best decrease the error using gradient descent. In response to this process, the albedo generator 605 and the discriminators 607 and 609 can be trained. Suitable error functions can be placed in suitable locations. At a first training forward pass, the weights can be defined as random numbers. Then Z can be generated, which serves as an input to the albedo generator 605. As embodiments perform the first forward pass on the albedo generator 605, the output image may likely be fake or not indicative of a particular albedo quality since the weights are random. Various embodiments pass this generated image through the discriminators 607 and 609. These discriminators output a probability to define the correct error functions. For example, if the label of a generated image is 0 (e.g., no albedo), but the discriminator 607 makes a prediction 0.54, this means that the discriminator 607 is not highly confident that the image does not contain a semantic map. Responsively, an error loss function (e.g., log loss) can be applied to get the prediction closer to 0. However, the albedo generator 606's goal is to use the loss of the discriminators as an objective function to modify parameters or weights of its model in order to maximize the loss of the discriminators. Using the example, above, the goal is to get the discriminator 607 to output a 1 instead of a 0. In this way, the loss from the discriminator 607 is passed to the albedo generator 605 so that it can maximize the loss (or get an incorrect prediction) of the discriminators.

In some embodiments, the error loss function of the discriminators 607 and/or 609 are: $E=-\ln(1-D(x))$, where D is the output of prediction of the discriminators. In some embodiments, the error loss function of the albedo generator 605 is $E=-\ln(D(G(z)))$, where G is the output or prediction of the albedo generator 605.

The derivatives of these two error loss functions can help the model update the weights of the albedo generator 605 and the discriminators 607 and 609 in order to improve a particular prediction. Accordingly, the tension or adversarial nature between these components adjusts weights in the respective models, such that there is no collision. This process can be repeated many times during training. After various iterations or epochs, the albedo generator 605 will be trained to generate images with pixel values with realistic albedo images based on the discriminator 607 and 609.

In some embodiments, at runtime or when a model is deployed after training, the albedo generator 605 generates actual albedo images (e.g., in response to a user request to re-shade an image) and because it has been trained with the correct loss, it outputs images in a manner that looks realistic. This is because it generates optimal pixel values inside an acceptable threshold determined by the discriminators 607 and 609.

Figure 7:
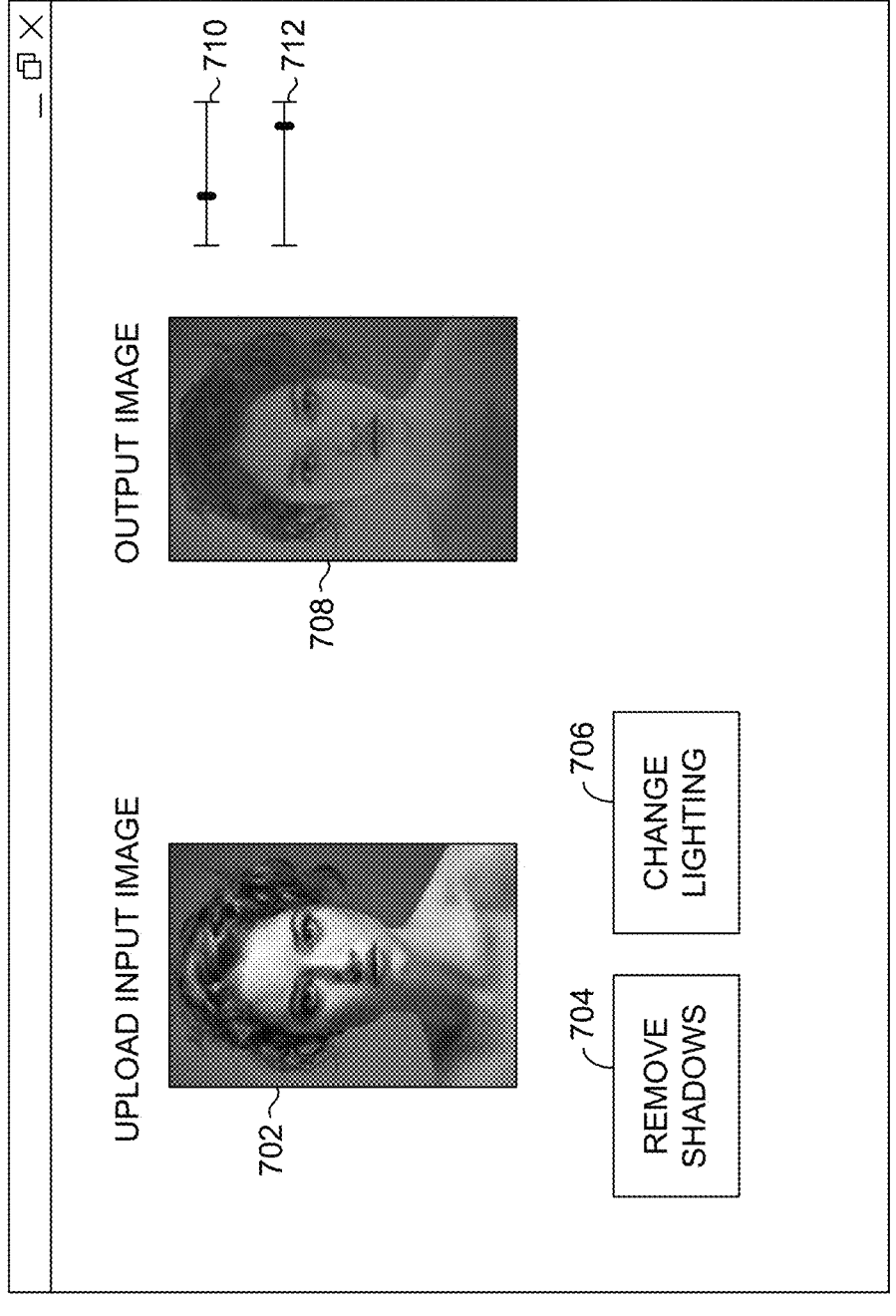
FIG. 7 is a screenshot of an example user interface for applying user-requested modification to an input image, according to some embodiments

FIG. 7 is a screenshot 700 of an example user interface for applying user-requested modification to an input image 702, according to some embodiments. In some embodiments, the screenshot 700 represents an instance of the consumer application 214 of FIG. 2. At a first time, particular embodiments receiving an indication that a user has uploaded the input image 702 (e.g., the input image 302 of FIG. 3). For example, in response to receiving an indication that a user has selected an "upload" button, some embodiments cause presentation of the input image 702.

In response to receiving an indication that the "remove shadows" button 704 has been selected, the segmentation map module 202, the normal map module 204, the inverse shading map module 206, the albedo module 208, and/or the discriminator module 212 as described with respect to FIG. 2 performs its functionality. For example, in response to receiving an indication that the button 704 has been selected, particular embodiments generate the inverse shading S image 306 of FIG. 3 and then the albedo A 310 of FIG. 3. In some embodiments, the output image 708 (e.g., the albedo A image 310 of FIG. 3) represents the albedo image, such that there is no indication of shadows, shading, and/or highlights In response to receiving an indication that the "change lighting" button 706 has been selected, the segmentation map module 202, the normal map module 204, the inverse shading map module 206, the albedo module 208, and/or the discriminator module 212 as described with respect to FIG. 2 performs its functionality. For example, in response to receiving an indication that the button 706 has been selected, particular embodiments generate the inverse shading S image 306 of FIG. 3 and then the albedo A 310 of FIG. 3, which may be the output image 708 of FIG. 7. In some embodiments, the UI elements 710 and 712 represent individual shading, tone, or lighting slider elements so that users can manually adjust these parameters according in a continuum of pixel values. For example, in response to receiving an indication that a slider in the UI element 710 is being slid to the right, particular embodiments directly and proportionately change the position of the shadows and/or light source such that shadows are moved from the left side of the face (as indicated in the input image 702) to the right side of the face in the output image 708.

Exemplary Flow Diagrams

FIG. 8 is a flow diagram of an example process 800 for training a machine learning model, according to some embodiments. The process 800 (and/or any of the functionality described herein) may be performed by processing logic that comprises hardware (e.g., an AI hardware accelerator or other circuitry, dedicated logic, programmable logic, microcode, etc.), software (e.g., instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. Added blocks may include blocks that embody any functionality described herein (e.g., as described with respect to FIG. 1 through FIG. 7). The computer-implemented method, the system (that includes at least one computing device having at least one processor and at least one computer readable storage medium), and/or the computer readable medium as described herein may perform or be caused to perform the process 800 or any other functionality described herein.

In some embodiments, the process 800 represents the functionality as described with respect to FIG. 4. Per block 802, some embodiments receive a training input image (e.g., image I 406 of FIG. 4) and a ground truth image (e.g., the ground truth image 414 of FIG. 4). Per block 804, based on the training input image, some embodiments derive an inverse shading map by generating a normal map and a segmentation map. To "derive" as described herein means to either generate or receive (e.g., from another compute node or component). In an illustrative example of block 804, referring back to FIG. 4, the U-NET 408 predicts the inverse shading map 410 based on receiving and using the segmentation map 402, the normal map 404, and the input image 406 as input.

Per block 806, based on the inverse shading map, some embodiments derive an albedo image. For example, as described with respect to FIG. 4, the input image 406 can be multiplied by the inverse shading map 410 to generate the albedo map 412. Per block 808, some embodiments compute a perceptual loss between the ground truth image and the albedo image. Perceptual loss functions are used when comparing RGB or appearance features between images. This function is used to compare high level differences, like content and style discrepancies, between images. In some embodiments, the perceptual loss function works by summing all the squared errors between all the pixels for the albedo image 412 and the ground truth 414, and then taking the mean.

Per block 810, some embodiments compute adversarial losses between the ground truth and the normal and segmentation maps. For example, referring back to FIG. 4, particular embodiments make the real versus fake determinations 420 and 422. In an illustrative example and referring back to FIG. 6, the loss between the results generated by the albedo generator 605 and the discriminators 607 and 609 are computed. In some embodiments, additional (or alternative) losses can be computed, such as L1 loss. L1 loss is used to minimize the error, which is the sum of all the absolute differences in between the true value and the predicted value. L1 loss is also known as the Absolute Error and the cost is the Mean of these Absolute Errors (MAE).

Per block 812, based on the perceptual loss and the adversarial losses, particular embodiments train a machine learning model to learn an inverse shading prediction function s. For example, particular embodiments learn the weight values to input at a weight tensor so that the inverse shading map does not exceed one or more thresholds (e.g., geometry and semantic features) relative to the ground truth image. Additionally, some embodiments learn other weight values to generate a realistic and seamless albedo results, where the weight values represent pixel values or orientations to generate the albedo based on learned patterns. Accordingly, over various training epochs, the machine learning model can learn to reduce the perceptual and adversarial losses via one or more loss function in order to set the weights at the appropriate levels for neural node processing.

A neural network is typically modeled as a data flow graph (DFG), where each node in the DFG is an operator with one or more input and output tensors. A "tensor" (e.g., a vector) is a data structure that contains values representing the input, output, and/or intermediate transformations processed by the operator. Each edge of the DFG depicts the dependency between the operators. This is different than a weight tensor, where weight tensors are modeled as flowing upward (not being actual inputs or outputs). Weight tensors are typically combined with the input/output tensors via a linear operation (e.g., matrix multiplication, addition, scaling, biasing, or convolution) to derive an output of a given node, and eventually a given prediction. A "weight" in the context of machine learning may represent the importance or significance of a feature or feature value for prediction. For example, each feature may be associated with an integer or other real number where the higher the real number, the more significant the feature is for its prediction. In one or more embodiments, a weight in a neural network represents the strength of a connection between nodes or neurons from one layer (an input) to the next layer (a hidden or output layer). A weight of 0 may mean that the input will not change the output, whereas a weight higher than 0 changes the output. The higher the value of the input or the closer the value is to 1, the more the output will change or increase. Likewise, there can be negative weights. Negative weights may proportionately reduce the value of the output. For instance, the more the value of the input increases, the more the value of the output decreases. Negative weights may contribute to negative scores. In some embodiments, the result of the linear operation is processed by a non-linear activation, such as a step function, a sigmoid function, a hyperbolic tangent function (tan h), and rectified linear unit functions (ReLU) or the like. The result of the activation or other operation is an output tensor that is sent to a subsequent connected node that is in the next layer of neural network. The subsequent node uses the output tensor as the input activation tensor to another node until one or more nodes at the output layer generates a score (e.g., a classification or regression confidence level prediction).

FIG. 9 is a flow diagram of an example process 900 for deriving an albedo output image from an input image, according to some embodiments. Per block 902, some embodiments receive an input image, where the input image includes: a set (i.e., one or more) of geometric features that define one or more portions of one or more real-world objects, a set of shadow features associated with the one or more real-world objects, and a set of color features that indicate one or more colors of the one or more real-world objects. A "geometric feature" as described herein refers to pixels that represent one or more physical geometric properties of a real-world object, such as lines, surfaces, shapes, texture, each of which is typically multi-dimensional (e.g., 3-dimensional). For example, a geometric feature can be the shape, lines, and skin texture of a human nose or a human nose itself. Geometric features typically exclude RGB or color appearance of the geometric features. In another example, the set of geometric features can be features of a human face (e.g., lips, eyes, eyelashes) and hair that is a part of the human face or head. In this way, for example, the one or more real-world objects can include the human face and hair.

A "shadow" feature as described herein refers to pixels that represent shading or shadows, such as gray-scale or RGB values representing shading cast on an object. The set of shadow features "associated with the one or more real-world objects" can mean shadows or shading that are cast on a real-world object, under the real-world object, or otherwise caused by the real-world object. For example, the set of shadow features can include shadows on the human face. A "color feature" as described herein refers to the RGB pixel values that represent the color appearance of the real-world objects or geometric features, such as skin color, hair color, eye color, or the like. For example, a color feature can include a skin color of the human face or hair color of the hair. A "real-world" object can refer to any tangible thing. For example, a real-world object can be a human face, a tree, a ball, a car, or the like. In some embodiments, a real-world object can alternatively or additionally refer to anything that has a natural language name or category even if it is not tangible, such as clouds, sky, fog, or the like.

In some embodiments, the input image further includes a set of lighting features that represent highlights or lighting on the one or more real-world objects. For example, the lighting features can be pixels that represent bright highlights on a human face which cause the human face to be different pixel values that are lighter in color relative to the pixel regions that represent the portion of the face not having highlights.

Per block 904, based on the input image, some embodiments derive (i.e., receive or generate) an inverse shading map, where the inverse shading map indicates the set of geometric features without the set of shadow features of the input image. In this way, the inverse shading map, while being a separate image or other data object relative to the input image, resembles or contains identical geometric features of the input image while at the same time excluding shadow features. For example, a machine learning model, such as U-net 304 of FIG. 3 or U-net 408 of FIG. 4 can derive the inverse shading S 306 or the inverse shading 410 as described with respect to FIG. 3 or FIG. 4 respectively. In some embodiments, block 904 includes the functionality as described to deriving the inverse shading map 306 or 410, as described with respect to FIG. 3 or FIG. 4 respectively. In some embodiments, the inverse shading map further resembles the input image, except it is without the set of color features of the input image. For example, the input image may be a RGB colored image, whereas the inverse shading map can be a negative gray-scaled image of the input image.

In some embodiments, where the inverse shading map is derived via a first model, the deriving of the inverse shading map is further based on generating, via a second model, a normal map (e.g., 404 of FIG. 4) and generating, via a third model, a segmentation map (e.g., 402 of FIG. 4), where the normal map indicates a microstructure texture of the one or more real-world objects, and where the segmentation map indicates, via a unique pixel map, different features of the one or more real-world objects, and where the normal map and the segmentation map are provided as input to the first model to produce the inverse shading map. In some embodiments, such functionality includes the functionality as described, for example, with respect to deriving the inverse shading map 410 via the label L 402, the normal N 404, and the image I 406, as described with respect to FIG. 4. Such functionality can occur during training or deployment/inference time.

In some embodiments, the model that generates the inverse shading map during runtime or at deployment does so via initially training. For example, particular embodiments train the first model by learning an inverse shading prediction function based on minimizing a perceptual loss between a ground truth image (e.g., 414 of FIG. 4) and an albedo training image (e.g., albedo A 412 of FIG. 4) and minimizing a discrimination loss between the ground truth image and a normal training image (e.g., normal image 404 of FIG. 4) or segmentation training image (e.g., Label L 402 of FIG. 4). In some embodiments, such training includes the process 800 of FIG. 8.

In some embodiments, the inverse shading map is further without the lighting features described above. For example, if pixels representing highlights on human hair are represented in the input image, the inverse shading map may contain different pixel values representing non-highlights over an area that originally represented the highlights in the input image. In this way, the inverse shading map appears as though there never were one or more highlights contained in the input image.

In some embodiments, the inverse shading map is or includes an image that includes negative lighting and shading relative to the input image. For example, the inverse shading map can be a negative image. A "negative image" is an image that reverses, from the input image to the inverse shading map, the tones or colors of pixels representing the one or more real-world objects. For example, the inverse shading map contains oppositely dark (e.g., black) pixels where (the exact coordinates of the pixels) the one or more objects were light (e.g., white) in the input image. And the inverse shading map contains oppositely light pixels where the one or more objects were dark in the input image. In this way, for example, pixels representing areas of shade or shadows in the input image can effectively be removed in the inverse shading map because that area will contain reversed lighter pixel color values representing a non-shaded area.

Per block 906, based on the inverse shading map and the input image, some embodiments derive an albedo output image, where the albedo output image indicates the set of geometric features and the set of color features but not the set of shadow features. An "albedo output image" is an image that resembles the input image and contains the albedo of pixels representing one or more portions of the one or more real-world objects, which typically preserves the color, geometric features, but not shadows of the input image. In some embodiments, the albedo output image does not include the lighting features described above. For example, the albedo output image can contain no pixels representing highlights.

In some embodiments, the albedo output image includes a second set of color features in a same position (e.g., pixel row/column coordinates) as the set of shadow features such that the second set of color features is indicative of shadow removal from the input image. For example, an input image may contain black pixel values representing a shadow over half of the human face. However, the albedo output image may contain peach colored pixel values over the same half of the human face, which indicates the human face without the shadow. In other words, the same dark pixel values that represented shadows in the human face in the input image are changed to lighter pixel values to represent the human face without shadows. This effectively removes the shadow from the human face.

In some embodiments, the deriving of the albedo output image is further based on generating (or modifying) the albedo output image via a second model, such as a Generative Adversarial Network (GAN). In some embodiments, this includes the functionality as described with respect to the GAN 600 of FIG. 6, the real or fake determinations 420 or 422 of FIG. 4, or the discriminator model/layer 520 of FIG. 5. In some embodiments, the deriving of the albedo output image is additionally or alternatively based on multiplying the input image by the inverse shading map, as described, for example, with respect to the multiplication 308 of FIG. 3.

Experimental Results

As described herein, particular embodiments improve the accuracy and quality of existing generative approach and residual prediction technologies. This section describes experimental setup and results that experimenting researchers achieved with respect to accuracy and quality for some embodiments described herein In this section, the researchers validate the idea of inverse shading prediction by comparing it with existing methods. With respect to the dataset for the experimental results, for training of the inverse shading prediction model, the researchers used Adobe's internal ligthstage and synthetic human dataset. In total, the researchers used 1.9Mdata for training, and 5K data for testing. Only for the qualitative results, the researchers also show the testing results on in-the-wild images (i.e., images that the model has not trained on).

Regarding the metrics, the researchers use Learned Perceptual Image Patch Similarity (LPIPS) to validate the overall human albedo reconstruction (i.e., albedo output image) quality and its quality in high-frequency details. This metric measures the feature space distance between the predicted albedo (i.e., the albedo output image) and the ground truth using the learned features from a neural network. The lower score means better reconstruction quality

TABLE 1

|  | Direct | Residual | Inverse shading (Ours) |
|---|---|---|---|
| LPIPS ↓ | 0.0404 | 0.0416 | 0.0353 |

Table 1 describes quantitative evaluation for the comparison of existing methods (Direct and Residual) with the method described in FIG. 1 (i.e., "our" method), which is the inverse shading prediction method. For the baseline, the researchers used two baseline methods to compare our inverse shading prediction methods. (1) Direct generation, which directly generate the albedo from an image. (2) Residual prediction, which reconstructs the albedo by adding the predicted appearance residual. Each model was trained with 3 epochs.

Regarding the Results In Table 1, its show the quantitative comparison results where our method performs the best with the lowest LPIPS score. The researchers have also demonstrate the visual comparison with baseline methods where the inverse shading prediction enables the improved albedo reconstruction quality compared to baseline methods in terms of texture preservation, skin tone preservation, and shadow removal quality.

Exemplary Operating Environments

Figure 10:
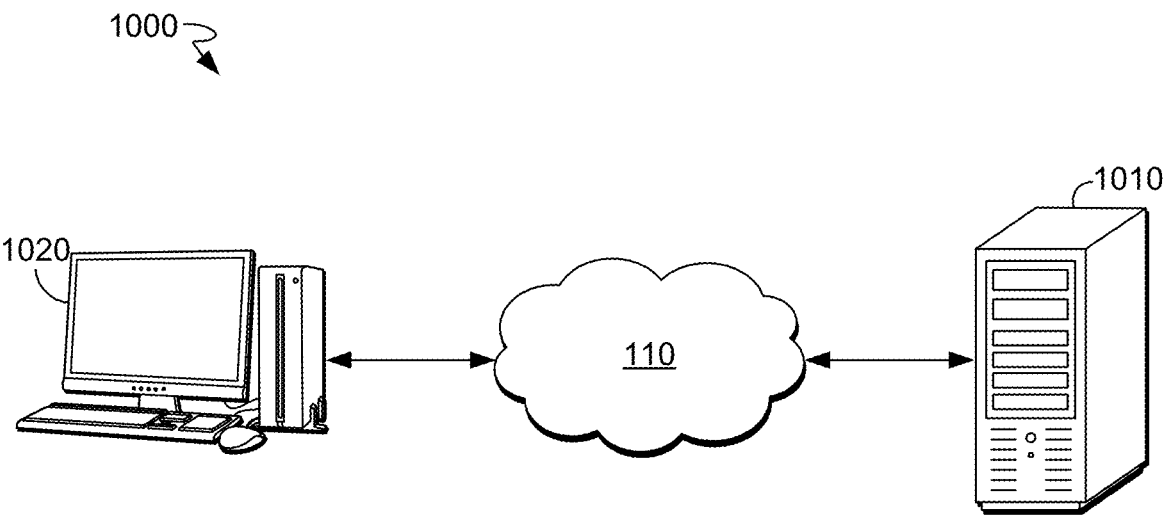
FIG. 10 is an example computer environment in which aspects of the present disclosure are employed, according to some embodiments.

Turning now to FIG. 10, a schematic depiction is provided illustrating an example computing environment 1000 for recommending one or more color values for applying to an input image, in which some embodiments of the present invention may be employed. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. For example, there may be multiple servers 1010 that represent nodes in a cloud computing network. Various functions described herein as being performed by one or more entities may be carried out by hardware, firmware, and/or software. For instance, various functions may be carried out by a processor executing instructions stored in memory.

The environment 1000 depicted in FIG. 10 includes a prediction server ("server") 1010 that is in communication with a network 110. The environment 900 further includes a client device ("client") 920 that is also in communication with the network 210. Among other things, the client 1020 can communicate with the server 1010 via the network 210, and generate for communication, to the server 1010, a request to make a detection, prediction, or classification of one or more instances of a document/image. The request can include, among other things, a document with content order values. In various embodiments, the client 1020 is embodied in a computing device, which may be referred to herein as a client device or user device, such as described with respect to the computing device 1100 of FIG. 11.

In some embodiments, each component in FIG. 2 is included in the server 1010 and/or the client device 1020. Alternatively, in some embodiments, the components of FIG. 2 are distributed between the server 1010 and client device 1020.

The server 1010 can receive the request communicated from the client 1020, and can search for relevant data via any number of data repositories to which the server 1010 can access, whether remotely or locally. A data repository can include one or more local computing devices or remote computing devices, each accessible to the server 1010 directly or indirectly via network 210. In accordance with some embodiments described herein, a data repository can include any of one or more remote servers, any node (e.g., a computing device) in a distributed plurality of nodes, such as those typically maintaining a distributed ledger (e.g., block chain) network, or any remote server that is coupled to or in communication with any node in a distributed plurality of nodes. Any of the aforementioned data repositories can be associated with one of a plurality of data storage entities, which may or may not be associated with one another. As described herein, a data storage entity can include any entity (e.g., retailer, manufacturer, e-commerce platform, social media platform, web host) that stores data (e.g., names, demographic data, purchases, browsing history, location, addresses) associated with its customers, clients, sales, relationships, website visitors, or any other subject to which the entity is interested. It is contemplated that each data repository is generally associated with a different data storage entity, though some data storage entities may be associated with multiple data repositories and some data repositories may be associated with multiple data storage entities. In various embodiments, the server 1010 is embodied in a computing device, such as described with respect to the computing device 1100 of FIG. 11.

Figure 11:
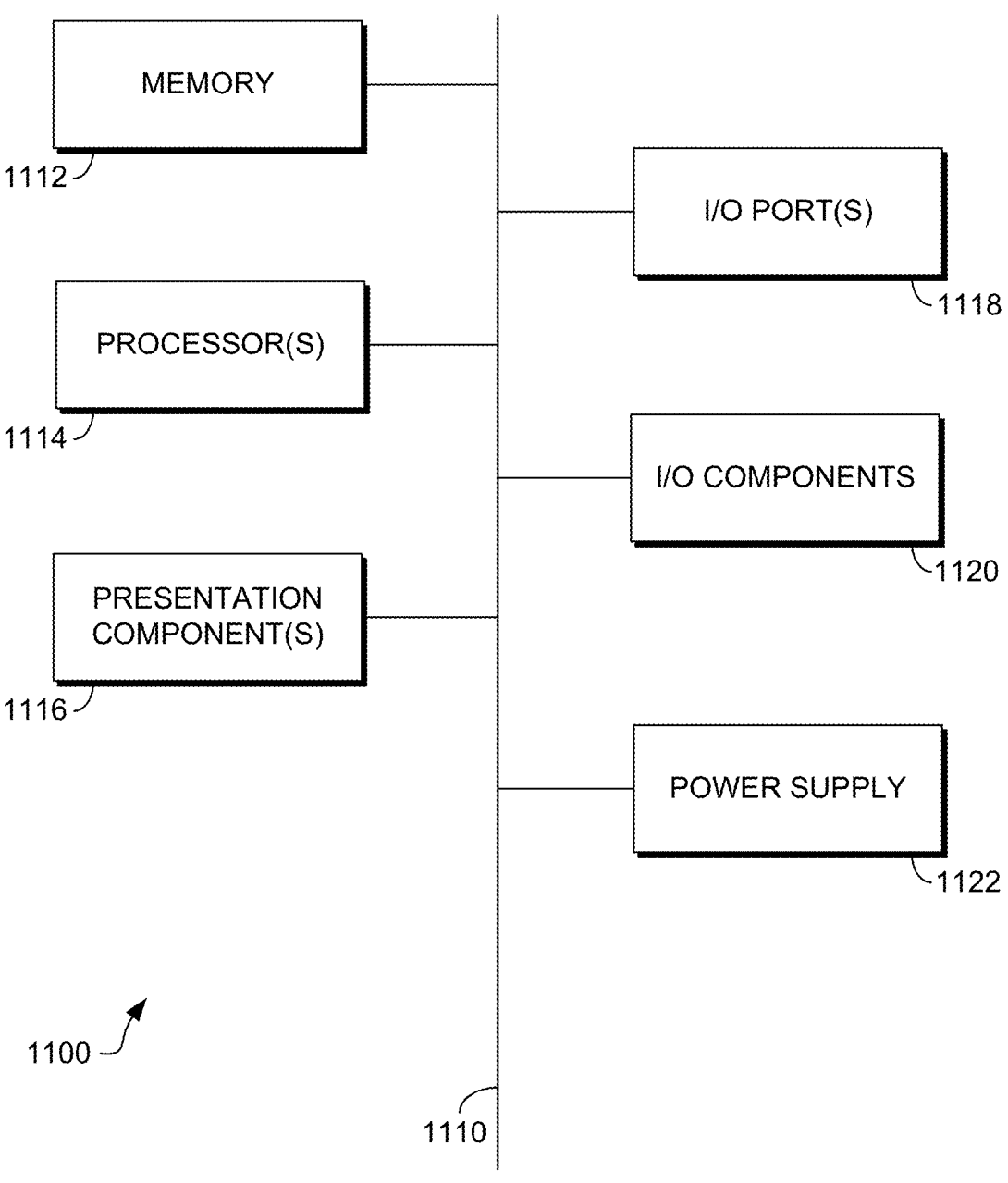
FIG. 11 is a block diagram of a computing device in which aspects of the present disclosure employ, according to some embodiments.

Having described embodiments of the present invention, an exemplary operating environment in which embodiments of the present invention may be implemented is described below in order to provide a general context for various aspects of the present invention. Referring initially to FIG. 11 in particular, an exemplary operating environment for implementing embodiments of the present invention is shown and designated generally as computing device 1100. Computing device 1100 is but one example of a suitable computing environment and is not intended to suggest any limitation as to the scope of use or functionality of the invention. Neither should the computing device 1100 be interpreted as having any dependency or requirement relating to any one or combination of components illustrated.

Looking now to FIG. 11, computing device 1100 includes a bus 10 that directly or indirectly couples the following devices: memory 12, one or more processors 14, one or more presentation components 16, input/output (I/O) ports 18, input/output components 20, and an illustrative power supply 22. Bus 10 represents what may be one or more busses (such as an address bus, data bus, or combination thereof). Although the various blocks of FIG. 11 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 11 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 11 and reference to "computing device."

Computing device 1100 typically includes a variety of computer-readable media. Computer-readable media can be any available media that can be accessed by computing device 1000 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1100. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media. In various embodiments, the computing device 1100 represents the client device 1020 and/or the server 1010 of FIG. 10.

Memory 12 includes computer-storage media in the form of volatile and/or nonvolatile memory. The memory may be removable, non-removable, or a combination thereof. Exemplary hardware devices include solid-state memory, hard drives, optical-disc drives, etc. Computing device 1100 includes one or more processors that read data from various entities such as memory 12 or I/O components 20. Presentation component(s) 16 present data indications to a user or other device. Exemplary presentation components include a display device, speaker, printing component, vibrating component, etc. In some embodiments, the memory includes program instructions that, when executed by one or more processors, cause the one or more processors to perform any functionality described herein, such as the process 900 of FIG. 9, process 800 of FIG. 8, or any functionality described with respect to FIGS. 1 through 10.

I/O ports 18 allow computing device 1100 to be logically coupled to other devices including I/O components 20, some of which may be built in. Illustrative components include a microphone, joystick, game pad, satellite dish, scanner, printer, wireless device, etc. The I/O components 20 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1100. The computing device 1100 may be equipped with depth cameras, such as stereoscopic camera systems, infrared camera systems, RGB camera systems, touchscreen technology, and combinations of these, for gesture detection and recognition. Additionally, the computing device 1100 may be equipped with accelerometers or gyroscopes that enable detection of motion. The output of the accelerometers or gyroscopes may be provided to the display of the computing device 1100 to render immersive augmented reality or virtual reality.

As can be understood, embodiments of the present invention provide for, among other things, generating proof and attestation service notifications corresponding to a determined veracity of a claim. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub combinations are of utility and may be employed without reference to other features and sub combinations. This is contemplated by and is within the scope of the claims.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A system comprising:
at least one computer processor; and
one or more computer storage media storing computer-useable instructions that, when used by the at least one computer processor, cause the at least one computer processor to perform operations comprising:
receiving an input image, the input image including: a set of geometric features that define one or more portions of one or more real-world objects, a set of shadow features associated with the one or more real-world objects, and a set of color features that indicate one or more colors of the one or more real-world objects;
generating a segmentation map and a normal map, the normal map indicating a texture of the one or more real-world objects, the segmentation map indicating, via a unique pixel mask, different features of the one or more real-world objects;
deriving an inverse shading map based on the segmentation map and the normal map, the inverse shading map indicating the set of geometric features without the set of shadow features; and
based on the inverse shading map, deriving an albedo output image, the albedo output image indicating the set of geometric features and the set of color features but not the set of shadow features.

2. The system of claim 1, wherein the deriving of the inverse shading map is further based on generating, via a second model, a normal map and generating, via a third model, a segmentation map, the normal map indicating a microstructure texture of the one or more real-world objects, the segmentation map indicating, via a unique pixel mask, different features of the one or more real-world objects, wherein the normal map and the segmentation map are provided as input to the first model to produce the inverse shading map.

3. The system of claim 1, wherein the deriving of the albedo output image is further based on generating the albedo output image via a second model, and wherein the second model is a Generative Adversarial Network (GAN).

4. The system of claim 1, wherein the deriving of the albedo output image is further based on multiplying the input image by the inverse shading map.

5. The system of claim 1, wherein the operations further comprising training the first model by learning an inverse shading prediction function based on minimizing a perceptual loss between a ground truth image and an albedo training image and minimizing a discrimination loss between the ground truth image and a normal training image or a segmentation training image.

6. The system of claim 1, wherein the set of geometric features are features of a human face and hair, and wherein the one or more real-world objects include the human face and hair, and wherein the set of shadow features include shadows on the human face, and wherein the set of color features include a skin color of the human face, or hair color of the hair.

7. The system of claim 1, wherein the input image further includes a set of lighting features that represent highlights or lighting on the one or more real-world objects, and wherein the inverse shading map is further without the lighting features, and wherein the albedo output image does not include the lighting features.

8. The system of claim 7, wherein the inverse shading map is an image that includes negative lighting and shading relative to the input image.

9. The system of claim 1, wherein the albedo output image includes a second set of color features in a same position as the set of shadow features, and wherein the second set of color features are indicative of shadow removal from the input image.

10. A computer-implemented method comprising:
receiving an input image, the input image including: a set of geometric features that define one or more portions of one or more real-world objects, a set of shadow features associated with the one or more real-world objects, and a set of color features that indicate one or more colors of the one or more real-world objects;
receiving a segmentation map and a normal map, the normal map indicating a texture of the one or more real-world objects, the segmentation map indicating, via a unique pixel mask, different features of the one or more real-world objects;

deriving an inverse shading map based the segmentation map and the normal map, the inverse shading map being a visual representation of the set of geometric features of the input image without the set of shadow features; and based on the inverse shading map and the input image, deriving an albedo output image, the albedo output image includes a second set of color features in a same position as the set of shadow features, and wherein second set of color features is indicative of shadow removal from the input image.

11. The computer-implemented method of claim 10, wherein the deriving of the inverse shading map is based on generating, via a first model, the inverse shading map, and wherein the deriving of the inverse shading map is further based on generating, via a second model, a normal map and generating, via a third model, a segmentation map, the normal map indicating a microstructure texture of the one or more real-world objects, the segmentation map indicating, via a unique pixel mask, different features of the one or more real-world objects, wherein the normal map and the segmentation map are provided as input to the first model to produce the inverse shading map.

12. The computer-implemented method of claim 10, wherein the deriving of the albedo output image is further based on generating or modifying the albedo output image via a Generative Adversarial Network (GAN).

13. The computer-implemented method of claim 10, wherein the deriving of the albedo output image is further based on multiplying the input image by the inverse shading map.

14. The computer-implemented method of claim 10, wherein the deriving of the inverse shading map is based on a first model generating the inverse shading map, and wherein the method further comprising training the first model by learning an inverse shading prediction function based on minimizing a perceptual loss between a ground truth image and an albedo training image and minimizing a discrimination loss between the ground truth image and a normal training image or a segmentation training image.

15. The computer-implemented method of claim 10, wherein the set of geometric features are features of a human face and hair, and wherein the one or more real-world objects include the human face and the hair, and wherein the set of shadow features include shadows on the human face, and wherein the set of color features include a skin color of the human face, or hair color of the hair.

16. The computer-implemented method of claim 10, wherein the input image further includes a set of lighting features that represent highlights or lighting on the one or more real-world objects, and wherein the inverse shading map is further without the lighting features, and wherein the albedo output image does not include the lighting features.

17. The computer-implemented method of claim 10, wherein the inverse shading map is an image that includes negative lighting and shading relative to the input image.

18. The computer-implemented method of claim 10, wherein the albedo output image indicates the set of geometric features and the set of color features but not the set of shadow features.

19. A computerized system, the system comprising:

an inverse shading map means for receiving an input image, the input image including: a set of geometric features that define one or more portions of one or more real-world objects, a set of shadow features associated with the one or more real-world objects, and a set of color features that indicate one or more colors of the one or more real-world objects;

at least one of a segmentation map means and a normal map means for generating at least one of a segmentation map and a normal map respectively, the normal map indicating a texture of the one or more real-world objects, the segmentation map indicating, via a unique pixel mask, different features of the one or more real-world objects;

and wherein the inverse shading map means is further for deriving an inverse shading map based on at least one of the segmentation map and the normal map, the inverse shading map indicating the set of geometric features without the set of shadow features; and an albedo means for deriving an albedo output image based on the inverse shading map, the albedo output image indicating the set of geometric features and the set of color features but not the set of shadow features.

20. The system of claim 19, wherein the inverse shading map is generated by a first model, the normal map is generated by a second model, and the segmentation map is generated by a third model, and wherein the normal map and the segmentation map are provided as input to the first model to produce the inverse shading map.

* * * * *